(12) United States Patent
Yang et al.

(10) Patent No.: US 12,461,340 B2
(45) Date of Patent: Nov. 4, 2025

(54) OPTICAL SYSTEM, IMAGE CAPTURING APPARATUS AND ELECTRONIC APPARATUS

(71) Applicant: JIANGXI JINGCHAO OPTICAL CO., LTD., Nanchang (CN)

(72) Inventors: Jian Yang, Nanchang (CN); Ming Li, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 727 days.

(21) Appl. No.: 17/606,005

(22) PCT Filed: Nov. 4, 2019

(86) PCT No.: PCT/CN2019/115349
§ 371 (c)(1),
(2) Date: Oct. 22, 2021

(87) PCT Pub. No.: WO2021/087669
PCT Pub. Date: May 14, 2021

(65) Prior Publication Data
US 2022/0206260 A1    Jun. 30, 2022

(51) Int. Cl.
*G02B 9/64* (2006.01)
*G02B 13/00* (2006.01)

(52) U.S. Cl.
CPC ............ *G02B 9/64* (2013.01); *G02B 13/0045* (2013.01)

(58) Field of Classification Search
CPC ...... G02B 9/64; G02B 13/0045; G02B 13/18; G02B 5/005; G02B 13/002; G02B 13/001
See application file for complete search history.

(56) References Cited

U.S. PATENT DOCUMENTS

| | | |
|---|---|---|
| 4,981,344 A | 1/1991 | Ueda |
| 6,414,800 B1 | 7/2002 | Hamano |

(Continued)

FOREIGN PATENT DOCUMENTS

| | | |
|---|---|---|
| CN | 1206842 A | 2/1999 |
| CN | 1297164 A | 5/2001 |

(Continued)

OTHER PUBLICATIONS

Gross, Wiley-VCH Verlag GmbH & Co. KGaA, vol. 3, pp. 378-379 (Year: 2007).*

(Continued)

*Primary Examiner* — William R Alexander
*Assistant Examiner* — MacKenzi Waddell
(74) *Attorney, Agent, or Firm* — Franklin & Associates International Inc; Matthew F. Lambrinos

(57) ABSTRACT

The present disclosure relates to an optical system, an image capturing apparatus and an electronic apparatus. The optical system includes a first lens, a second lens, a third lens, a fourth lens, a fifth lens, a sixth lens and a seventh lens in sequence from an object side to an image side along an optical axis. The first lens has positive refractive power, with an object-side surface being convex at the optical axis and an image-side surface being concave at the optical axis. The second lens has positive refractive power, with an object-side surface being convex at the optical axis. The third lens has negative refractive power, with an object-side surface being convex at the optical axis and an image-side surface being concave at the optical axis. The fifth lens has positive refractive power. The seventh lens has negative refractive power.

12 Claims, 15 Drawing Sheets

(56) References Cited

U.S. PATENT DOCUMENTS

| | | | |
|---|---|---|---|
| 6,985,309 B2 | 1/2006 | Shinohara | |
| 9,057,868 B1 | 6/2015 | Chung et al. | |
| 2004/0218285 A1 | 11/2004 | Amanai | |
| 2004/0264003 A1 | 12/2004 | Noda | |
| 2005/0046970 A1 | 3/2005 | Amanai | |
| 2008/0106801 A1 | 5/2008 | Kang et al. | |
| 2010/0254029 A1 | 10/2010 | Shinohara | |
| 2012/0075718 A1 | 3/2012 | Seo | |
| 2014/0063620 A1 | 3/2014 | Jung et al. | |
| 2014/0211324 A1* | 7/2014 | Ishizaka | G02B 27/0025 359/708 |
| 2015/0138425 A1 | 5/2015 | Lee et al. | |
| 2016/0124192 A1 | 5/2016 | Koreeda | |
| 2016/0161709 A1 | 6/2016 | Hsueh et al. | |
| 2017/0307858 A1 | 10/2017 | Chen | |
| 2018/0067333 A1 | 3/2018 | Ishibashi | |
| 2018/0113282 A1 | 4/2018 | Tsai | |
| 2019/0121065 A1* | 4/2019 | Wenren | G02B 9/64 |
| 2019/0196144 A1* | 6/2019 | Chen | G02B 27/0025 |
| 2020/0073092 A1 | 3/2020 | Chen | |
| 2020/0257085 A1* | 8/2020 | Yang | G02B 27/0025 |
| 2022/0206260 A1 | 6/2022 | Yang | |

FOREIGN PATENT DOCUMENTS

| | | | |
|---|---|---|---|
| CN | 101093274 A | 12/2007 | |
| CN | 101983348 A | 3/2011 | |
| CN | 102132189 A | 7/2011 | |
| CN | 102419470 A | 4/2012 | |
| CN | 102466864 A | 5/2012 | |
| CN | 202522758 U | 11/2012 | |
| CN | 102914851 A | 2/2013 | |
| CN | 102985865 A | 3/2013 | |
| CN | 102998774 A | 3/2013 | |
| CN | 103676088 A | 3/2014 | |
| CN | 103852858 A | 6/2014 | |
| CN | 103969804 A | 8/2014 | |
| CN | 104570277 A | 4/2015 | |
| CN | 104570295 A | 4/2015 | |
| CN | 104914558 A | 9/2015 | |
| CN | 104932086 A | 9/2015 | |
| CN | 204631345 U | 9/2015 | |
| CN | 105259636 A | 1/2016 | |
| CN | 105372793 A | 3/2016 | |
| CN | 105607232 A | 5/2016 | |
| CN | 105607233 A | 5/2016 | |
| CN | 205210492 U | 5/2016 | |
| CN | 205210493 U | 5/2016 | |
| CN | 105988185 A | 10/2016 | |
| CN | 105988186 A | 10/2016 | |
| CN | 106033141 A | 10/2016 | |
| CN | 106154496 A | 11/2016 | |
| CN | 106338815 A | 1/2017 | |
| CN | 106526796 A | 3/2017 | |
| CN | 206074890 U | 4/2017 | |
| CN | 106610518 A | 5/2017 | |
| CN | 106646825 A | 5/2017 | |
| CN | 106772931 A | 5/2017 | |
| CN | 106773008 A | 5/2017 | |
| CN | 106802469 A | 6/2017 | |
| CN | 106842512 A | 6/2017 | |
| CN | 106842514 A | 6/2017 | |
| CN | 106896474 A | 6/2017 | |
| CN | 106959500 A | 7/2017 | |
| CN | 106970464 A | 7/2017 | |
| CN | 107024756 A | 8/2017 | |
| CN | 107102425 A | 8/2017 | |
| CN | 107167897 A | 9/2017 | |
| CN | 107167902 A | 9/2017 | |
| CN | 206460205 U | 9/2017 | |
| CN | 107290843 A | 10/2017 | |
| CN | 206946078 U | 1/2018 | |
| CN | 206946079 U | 1/2018 | |
| CN | 107703609 A | 2/2018 | |
| CN | 107831588 A | 3/2018 | |
| CN | 207164341 U | 3/2018 | |
| CN | 107976770 A | 5/2018 | |
| CN | 108089278 A | 5/2018 | |
| CN | 108089317 A * | 5/2018 | G02B 13/0045 |
| CN | 207424362 U | 5/2018 | |
| CN | 207424363 U | 5/2018 | |
| CN | 108107548 A | 6/2018 | |
| CN | 108227146 A | 6/2018 | |
| CN | 207557562 U | 6/2018 | |
| CN | 108459394 A | 8/2018 | |
| CN | 207764467 U | 8/2018 | |
| CN | 108663780 A | 10/2018 | |
| CN | 108761745 A | 11/2018 | |
| CN | 108873250 A | 11/2018 | |
| CN | 109283665 A | 1/2019 | |
| CN | 109375346 A | 2/2019 | |
| CN | 208506348 U | 2/2019 | |
| CN | 109407267 A | 3/2019 | |
| CN | 208705550 U | 4/2019 | |
| CN | 109725406 A | 5/2019 | |
| CN | 109752823 A | 5/2019 | |
| CN | 109814234 A | 5/2019 | |
| CN | 109814235 A | 5/2019 | |
| CN | 208833988 U | 5/2019 | |
| CN | 208872939 U | 5/2019 | |
| CN | 208888449 U | 5/2019 | |
| CN | 109839721 A | 6/2019 | |
| CN | 109870786 A | 6/2019 | |
| CN | 109870788 A | 6/2019 | |
| CN | 109917533 A | 6/2019 | |
| CN | 109960013 A | 7/2019 | |
| CN | 110018556 A | 7/2019 | |
| CN | 209070186 U | 7/2019 | |
| CN | 110109226 A | 8/2019 | |
| CN | 110208927 A | 9/2019 | |
| CN | 110261997 A | 9/2019 | |
| CN | 110398815 A | 11/2019 | |
| CN | 110426822 A | 11/2019 | |
| CN | 110531500 A | 12/2019 | |
| CN | 110568583 A | 12/2019 | |
| CN | 110618522 A | 12/2019 | |
| CN | 209765129 U | 12/2019 | |
| CN | 110646919 A | 1/2020 | |
| CN | 110646921 A | 1/2020 | |
| CN | 110794555 A | 2/2020 | |
| CN | 110879454 A | 3/2020 | |
| CN | 111007649 A | 4/2020 | |
| CN | 111025600 A | 4/2020 | |
| CN | 111308688 A | 6/2020 | |
| CN | 111338057 A | 6/2020 | |
| CN | 210720853 U | 6/2020 | |
| CN | 210720856 U | 6/2020 | |
| CN | 111399186 A | 7/2020 | |
| CN | 211786331 U | 10/2020 | |
| CN | 212540846 U | 2/2021 | |
| JP | 2008268977 A | 11/2008 | |
| JP | 2013235242 A | 11/2013 | |
| KR | 1020140135909 A | 11/2014 | |
| TW | 201350956 A | 12/2013 | |
| TW | 201627713 A | 8/2016 | |
| TW | I614523 B | 2/2018 | |
| TW | I625567 B | 6/2018 | |
| TW | I640811 B | 11/2018 | |
| TW | I655474 B | 4/2019 | |
| WO | 2003046633 A2 | 6/2003 | |
| WO | 2014162779 A1 | 10/2014 | |
| WO | 2015159721 A1 | 10/2015 | |
| WO | 2017180362 A1 | 10/2017 | |
| WO | 2020073978 A1 | 4/2020 | |
| WO | 2020220444 A1 | 11/2020 | |
| WO | 2020258269 A1 | 12/2020 | |
| WO | 2021026869 A1 | 2/2021 | |
| WO | 2021072745 A1 | 4/2021 | |
| WO | 2021087661 A1 | 5/2021 | |
| WO | 2021087669 A1 | 5/2021 | |
| WO | 2021102943 A1 | 6/2021 | |
| WO | 2021103797 A1 | 6/2021 | |
| WO | 2021109127 A1 | 6/2021 | |

(56) References Cited

FOREIGN PATENT DOCUMENTS

| WO | 2021138754 A1 | 7/2021 |
|---|---|---|
| WO | 2021179207 A1 | 9/2021 |
| WO | 2021184164 A1 | 9/2021 |
| WO | 2021184165 A1 | 9/2021 |
| WO | 2021184167 A1 | 9/2021 |
| WO | 2021203277 A1 | 10/2021 |
| WO | 2021217504 A1 | 11/2021 |
| WO | 2021217664 A1 | 11/2021 |

OTHER PUBLICATIONS

International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
European Search Report issued Aug. 7, 2022, on a PCT No. PCT/CN2019/115349, filed Nov. 4, 2019.
International Search Report and Written Opinion issued Oct. 22, 2021, on a PCT No. PCT/CN2019/115349, filed Nov. 4, 2019.
International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of OFilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.
Notification to Grant Patent Right for Invention dated Apr. 25, 2025, issued by The State Intellectual Property Office of People's Republic of China on Application No. CN201911066482X filed in the name of Jiangxi Jingchao Optical Co., Ltd.
Office Action dated Nov. 26, 2024, issued by The State Intellectual Property Office of People's Republic of China on Application No. CN201911066482X filed in the name of Jiangxi Jingchao Optical Co., Ltd.

\* cited by examiner

OPTICAL SYSTEM, IMAGE CAPTURING APPARATUS AND ELECTRONIC APPARATUS

CROSS REFERENCE TO RELATED APPLICATION

This application is a national stage, filed under 35 U.S.C. § 371, of PCT Patent Application No. PCT/CN2019/115349, entitled "OPTICAL SYSTEM, IMAGE CAPTURING APPARATUS AND ELECTRONIC APPARATUS", filed on Nov. 4, 2019, the contents of which are incorporated by reference herein in its entirety.

TECHNICAL FIELD

The present disclosure relates to the field of optical imaging technologies, more particularly, to an optical system, an image capturing apparatus and an electronic apparatus.

BACKGROUND

In recent years, with the extensive application of electronic products such as mobile phones, tablet computers, unmanned aerial vehicles and computers in our lives, people pay more and more attention to the improvement and innovation of photographic effects of lenses in these electronic products. Lenses capable of taking bright pictures with good picture quality and high definition are more and more popular among users. On the other hand, with the progress of science and technology, pixel sizes of photosensitive elements such as charge-coupled devices (CCDs) and CMOSs are increasingly smaller, so that the imaging quality of a matching optical system is required to be increasingly better.

However, a conventional miniaturized lens, while ensuring the imaging definition, has weak dark-light photographing capability, which cannot meet photographing needs of dark-light scenes such as night scenes, rainy days and starry sky.

SUMMARY

According to various embodiments of the present disclosure, an optical system is provided.

An optical system, including a first lens, a second lens, a third lens, a fourth lens, a fifth lens, a sixth lens and a seventh lens in sequence from an object side to an image side along an optical axis, wherein
the first lens has positive refractive power, with an object-side surface being convex at the optical axis and an image-side surface being concave at the optical axis;
the second lens has positive refractive power, with an object-side surface being convex at the optical axis;
the third lens has negative refractive power, with an object-side surface being convex at the optical axis and an image-side surface being concave at the optical axis;
the fifth lens has positive refractive power, with an image-side surface being convex at the optical axis;
the seventh lens has negative refractive power, with an image-side surface being concave at the optical axis; and
the optical system satisfies the following relation: TTL/ImgH<1.3;
where TTL is a distance on the optical axis from the object-side surface of the first lens to an imaging surface of the optical system, and ImgH is half of a diagonal length of an effective pixel region on the imaging surface of the optical system.

An image capturing apparatus, including the optical system according to the above embodiment; and a photosensitive element, the photosensitive element being arranged on the image side of the optical system.

An electronic apparatus, including: a housing; and the image capturing apparatus according to the above embodiment, the image capturing apparatus being mounted to the housing.

Details of one or more embodiments of the present disclosure are set forth in the following accompanying drawings and descriptions. Other features, objectives and advantages of the present disclosure become obvious with reference to the specification, the accompanying drawings, and the claims.

BRIEF DESCRIPTION OF THE DRAWINGS

In order to better describe and illustrate embodiments or examples of those inventions disclosed herein, reference may be made to one or more accompanying drawings. Additional details or examples used to describe the accompanying drawings should not be considered as limitations on the scope of any of the disclosed inventions, the presently described embodiments or examples, and the presently understood best mode of these inventions.

DETAILED DESCRIPTION OF THE EMBODIMENTS

Figure 1:
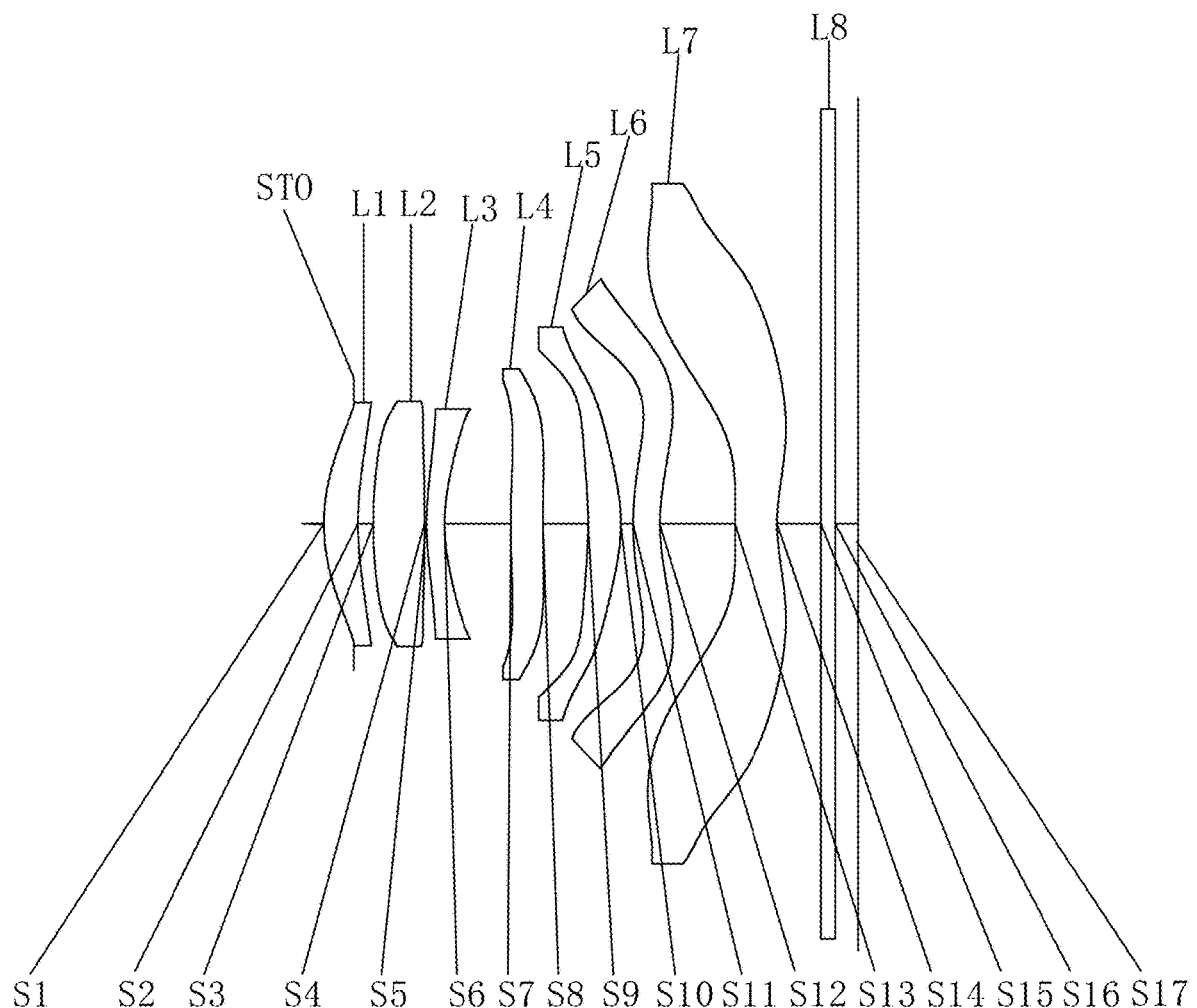
FIG. 1 is a schematic view of an optical system according to Embodiment 1 of the present disclosure.

In order to make the objectives, technical solutions and advantages of the present disclosure clearer, the present disclosure is described in further detail below with reference to the accompanying drawings and embodiments. It should be understood that particular embodiments described herein are intended only to interpret the present disclosure and not intended to limit the present disclosure.

It should be noted that when one element is referred to as "arranged on" another element, it may be directly on the other element or an intermediate element may exist. When one element is considered to be "connected to" another element, it may be directly connected to the other element or an intermediate element may co-exist. The terms "vertical", "horizontal", "left", "right" and similar expressions used herein are for illustrative purposes only and do not indicate a unique implementation.

It should be noted that in the specification, expressions such as first, second and third are used only to distinguish one feature from another feature, and do not imply any limitation on features. Therefore, a first lens discussed below may also be referred to as a second lens or third lens without departing from the teaching of the present disclosure.

It should be noted that one surface of each lens in an optical system close to an object side is referred to as an object-side surface, and one surface close to an image side is referred to as an image-side surface. For ease of description, spherical or aspheric shapes shown in the accompanying drawings are illustrated with examples. That is, spherical or aspheric shapes are not limited to the spherical or aspheric shapes shown in the accompanying drawings. The accompanying drawings are merely examples, not strictly drawn to scale.

Unless defined otherwise, all technical and scientific terms used herein have the same meanings as are commonly understood by those skilled in the art. The terms used herein in the specification of the present disclosure are for the purpose of describing specific embodiments only but not intended to limit the present disclosure. The term "and/or" used herein includes any and all combinations of one or more related listed items.

The conventional miniaturized lens, while ensuring the imaging quality, has a small aperture, and thus has weak dark-light photographing capability, which cannot meet photographing needs of dark-light environments such as night scenes, rainy days and starry sky.

The defects in the above solutions are results obtained by the inventor after practice and careful study. Therefore, the discovery process of the above problems and the solutions to the above problems proposed below in embodiments of the present disclosure all should be contributions of the inventor to the present disclosure.

Features, principles and other aspects of the present disclosure are described in detail below.

Referring to FIG. 1, FIG. 3, FIG. 5, FIG. 7 and FIG. 9 together, the present disclosure according to embodiments provides an optical system capable of meeting application requirements of miniaturization and configured with a large aperture and good imaging quality. The optical system specifically includes seven lenses with refractive power, that is, a first lens, a second lens, a third lens, a fourth lens, a fifth lens, a sixth lens and a seventh lens, and an imaging surface located on an image side of the seventh lens. The seven lenses are arranged in sequence from an object side to an image side along an optical axis.

The first lens has positive refractive power and thus can share a role of focusing light with the second lens, so that surface changes of the first lens and the second lens are relatively gentle, thereby avoiding excessive aberration. The first lens has an object-side surface being convex at the optical axis and an image-side surface being concave at the optical axis. This is conducive to convergence of light in a Sagittal direction and a Tangential direction to correct astigmatism.

The second lens has positive refractive power, which can improve light convergence capability of the optical system to reduce a total length of the optical system and realize miniaturization. The second lens has an object-side surface being convex at the optical axis. This is conducive to making the second lens have enough capability to focus light, thereby further reducing the total length of the optical system.

The third lens has negative refractive power, which can effectively correct chromatic aberration and avoid image overlap caused by shift of imaging positions of different colored light. The third lens has an object-side surface being convex at the optical axis and an image-side surface being concave at the optical axis. This is conducive to compensating for the aberration generated by the second lens and improving the imaging quality.

The fifth lens has positive refractive power and has an image-side surface being convex at the optical axis. This is conducive to further correcting the aberration of the optical system.

The seventh lens has negative refractive power, which can ensure that a rear focal length of the optical system is obtained and facilitate the adaptation of the optical system to slim electronic apparatuses. The sixth lens has an image-side surface being concave at the optical axis, so as to further configure the rear focal length of the optical system to ensure the miniaturization of the optical system.

Specifically, the optical system satisfies the following relation: TTL/ImgH<1.3; where TTL is a distance on the optical axis from the object-side surface of the first lens to an imaging surface of the optical system (i.e., a total length of the optical system), and ImgH is half of a diagonal length of an effective pixel region on the imaging surface of the optical system. The ratio TTL/ImgH may be equal to 1.20, 1.22, 1.24, 1.26 or 1.28. The total length of the optical system and a diagonal distance of the effective pixel region of the imaging surface of the optical system are controlled to satisfy the above relation. This can ensure that a small total length of the optical system is obtained and meet the application requirements of miniaturization.

When the optical system is applied to imaging, light emitted from or reflected by a subject enters into the optical system from an object-side thereof, sequentially passes through the first lens, the second lens, the third lens, the fourth lens, the fifth lens, the sixth lens and the seventh lens, and is finally focused on the imaging surface.

The focal power and surface types of the lenses of the optical system and pitches among the lenses are reasonably allocated, so as to ensure that the optical system has a small total length, thereby better meeting the application requirements of slim electronic devices. At the same time, the aberration of the optical system can be reduced to ensure the imaging quality of the optical system.

In an exemplary implementation, an effective focal length of the optical system is f, a curvature radius of the image-side surface of the seventh lens at the optical axis is R14, and the optical system satisfies the following relation: 1.5<f/R14<2.6. The ratio f/R14 may be equal to 1.65, 1.75, 1.85, 1.95, 2.05, 2.15, 2.25, 2.35, 2.45 or 2.55. Under a condition that the above relation is satisfied, it is conducive to optimizing the value of the curvature radius of the image-side surface of the seventh lens at the optical axis, so as to better match a chief ray angle of an inner field of view of a photosensitive element on the imaging surface and improve brightness of the central of a picture.

In an exemplary implementation, an f-number (i.e., F-number) of the optical system is FNO, and the optical system satisfies the following relation: FNO<1.9. The ratio FNO may be equal to 1.78, 1.80, 1.82, 1.84, 1.86 or 1.88. Under a condition that the above relation is satisfied, in a case where the miniaturization and a constant effective focal length of the optical system are ensured, the optical system has a larger clear aperture and more incoming light than the conventional miniaturized lens, which can improve dark-light photographing performance of the lens and improve imaging definition, thereby meeting the photographing needs of dark-light scenes such as night scenes and starry sky. In addition, a smaller FNO indicates that the optical system also has a better blurring effect, which can bring better visual experience to the users.

In an exemplary implementation, an effective focal length of the second lens is f2, an effective focal length of the optical system is f, and the optical system satisfies the following relation: $1<f2/f<1.7$. The ratio f2/f may be equal to 1.15, 1.20, 1.25, 1.30, 1.35, 1.40, 1.45, 1.50, 1.55, 1.60 or 1.65. Under a condition that the above relation is satisfied, it is easy to optimize the effective focal length of the second lens. This is conducive to reducing a deflection angle of light emitted from the optical system, and at the same time, can also reduce the sensitivity of the second lens in the optical system.

In an exemplary implementation, a distance on the optical axis from the object-side surface of the first lens to the imaging surface of the optical system is TTL, a distance on the optical axis from the image-side surface of the third lens to the object-side surface of the fourth lens is T34, and the optical system satisfies the following relation: $7<TTL/T34<12$. The ratio TTL/T34 may be equal to 7.5, 8.0, 8.5, 9.0, 9.5, 10.0, 10.5, 11.0 or 11.5. Under a condition that the above relation is satisfied, it is easy to optimize a gap distance between the third lens and the fourth lens to effectively increase an emitting angle of field-of-view light at an edge of the optical system (i.e., a cone angle formed between light emitted from the edge of the system and the imaging surface), so as to brighten the periphery of the imaging surface and improve the relative brightness of the image.

In an exemplary implementation, a distance on the optical axis from the object-side surface of the first lens to the imaging surface of the optical system is TTL, an effective focal length of the optical system is f, and the optical system satisfies the following relation: $1<TTL/f<1.3$. The ratio TTL/f may be equal to 1.05, 1.08, 1.11, 1.14, 1.17, 1.20 or 1.23. Under a condition that the above relation is satisfied, the total length of the optical system can be ensured to be small, and the effective focal length of the optical system can be optimized to achieve high-definition imaging performance. At the same time, if the total length of the optical system is determined, the smaller the effective focal length of the optical system, the larger the field-of-view angle, and the optical system has wide-angle characteristics. The larger the effective focal length of the optical system, the smaller the field-of-view angle, and the optical system has telephoto characteristics. In addition, if the above ratio is less than or equal to 1, the size of the optical system is too small, which may increase the sensitivity of the system and is not conducive to the correction of aberration. If the above ratio is greater than or equal to 1.3, the size of the optical system is too large, which may make a chief ray angle on the imaging surface too large, so that the light emitted from the edge of the system cannot be imaged in the effective pixel region, resulting in incomplete imaging information.

In an exemplary implementation, a curvature radius of the object-side surface of the sixth lens at the optical axis is R11, a curvature radius of the image-side surface of the sixth lens at the optical axis is R12, and the optical system satisfies the following relation: $-50<(R11+R12)/(R11-R12)<100$. The ratio $(R11+R12)/(R11-R12)$ may be equal to −45, −10, 5, 6, 7, 8, 10, 20, 30, 40, 50, 60, 70 or 80. Under a condition that the above relation is satisfied, it is easy to adjust the curvature radii of the object-side surface and the image-side surface of the sixth lens at the optical axis, so as to properly increase a light incident region on the imaging surface, meet image height requirements of the optical system, reduce the sensitivity of the optical system, and improve the assembly stability of the optical system.

In an exemplary implementation, a distance on the optical axis from the object-side surface of the first lens to the imaging surface of the optical system is TTL, a thickness of the seventh lens on the optical axis is CT7, and the optical system satisfies the following relation: $8<TTL/CT7<15$. The ratio TTL/CT7 may be equal to 8.5, 9.0, 9.5, 10.0, 10.5, 11.0, 11.5, 12.0, 12.5 or 13.0. Under a condition that the above relation is satisfied, the machinability of the seventh lens can be guaranteed. At the same time, if the above ratio is too small, the size of the optical system is too small, which easily increases the sensitivity of the optical system. If the above ratio is too large, the size of the optical system is too large. This is not conducive to imaging and cannot meet the application requirements of slim electronic devices.

In an exemplary implementation, the optical system further includes an aperture diaphragm. The aperture diaphragm may be arranged between the object side of the optical system and the first lens or between the first lens and the seventh lens. In some other embodiments, the aperture diaphragm may also be located on a surface (e.g., the object-side surface or the image-side surface) of any one of the first lens to the seventh lens, to form an operating relationship with the lens. For example, the aperture diaphragm is formed on the surface of the lens by coating the surface with a photoresist coating; or the surface of the lens is clamped by a gripper, and the structure of the gripper located on the surface can limit a width of an imaging beam of an on-axis object point, thereby forming the aperture diaphragm on the surface. Preferably, the aperture diaphragm is located between the object side of the optical system and the first lens to effectively prevent an excessive increase in the chief ray angle, so that the chief ray is better matched with a photosensitive chip of a conventional specification.

In an exemplary implementation, lens surfaces of each lens in the first lens to the seventh lens are both aspheric, so that the flexibility of lens design can be improved and the aberration can be corrected effectively, so as to improve the imaging resolution of the optical system. In some other embodiments, both the object-side surface and the image-side surface of each lens in the optical system may also be spherical. It should be noted that the above embodiments are only examples of some embodiments of the present disclosure. In some embodiments, the surfaces of each lens in the optical system may be any combination of an aspheric surface and a spherical surface.

In an exemplary implementation, the lenses in the optical system may be all made of glass or all made of plastic. The lens made of plastic can reduce the weight of the optical system and reduce manufacturing costs, while the lens made of glass can provide the optical system with excellent optical properties and good temperature-resistance characteristics. It should be noted that the lenses in the optical system may also be made of any combination of glass and plastic, and may not be necessarily all made of glass or all made of plastic.

In an exemplary implementation, the optical system further includes a filter configured to filter out infrared light and/or protection glass configured to protect a photosensitive element, wherein the photosensitive element is located on an imaging surface of the optical system. Further, the imaging surface may be a photosensitive surface of the photosensitive element.

The optical system according to the above implementation of the present disclosure may include a plurality of lenses, for example, seven lenses described above. The focal lengths, refractive power, surface types and thicknesses of the lenses and on-axis pitches among the lenses are reasonably allocated, which can ensure that the optical system has a small total length and a large aperture (FNO may be 1.78), and at the same time has better imaging quality, so as to better meet the requirements of adaptation to slim electronic devices, such as mobile phones and tablet computers, and dark-light photographing needs. It may be understood that the optical system is not limited to including seven lenses, although an example of seven lenses is described in the implementation. The optical system may also include other numbers of lenses if necessary.

Specific embodiments of the optical system applicable to the above implementation are further described below with reference to the accompanying drawings.

Embodiment 1

An optical system according to Embodiment 1 of the present disclosure is described below with reference to FIG. 1 to FIG. 2C.

FIG. 1 is a schematic view of an optical system according to Embodiment 1. As shown in FIG. 1, the optical system includes a first lens L1, a second lens L2, a third lens L3, a fourth lens L4, a fifth lens L5, a sixth lens L6, a seventh lens L7 and an imaging surface S17 in sequence from an object side to an image side along an optical axis.

The first lens L1 has positive refractive power, with an object-side surface S1 being convex at the optical axis and convex at the circumference and an image-side surface S2 being concave at the optical axis and concave at the circumference.

The second lens L2 has positive refractive power, with an object-side surface S3 being convex at the optical axis and convex at the circumference and an image-side surface S4 being convex at the optical axis and convex at the circumference.

The third lens L3 has negative refractive power, with an object-side surface S5 being convex at the optical axis and concave at the circumference and an image-side surface S6 being concave at the optical axis and concave at the circumference.

The fourth lens L4 has positive refractive power, with an object-side surface S7 being convex at the optical axis and concave at the circumference and an image-side surface S8 being concave at the optical axis and convex at the circumference.

The fifth lens L5 has positive refractive power, with an object-side surface S9 being concave at the optical axis and concave at the circumference and an image-side surface S10 being convex at the optical axis and convex at the circumference.

The sixth lens L6 has negative refractive power, with an object-side surface S11 being convex at the optical axis and concave at the circumference and an image-side surface S12 being concave at the optical axis and convex at the circumference.

The seventh lens L7 has negative refractive power, with an object-side surface S13 being convex at the optical axis and convex at the circumference and an image-side surface S14 being concave at the optical axis and convex at the circumference.

The object-side surface and the image-side surface of each of the first lens L1 to the seventh lens L7 are both aspheric. The design of aspheric surfaces can solve the problem of distortion of the field of view, and enable the lens to achieve an excellent optical imaging effect in the case of being smaller, thinner and flatter, so as to make the optical system have miniaturization characteristics.

The first lens L1 to the seventh lens L7 are all made of plastic. The lens made of plastic can reduce the weight of the optical system and can further reduce manufacturing costs.

A diaphragm STO is further arranged between an object OBJ and the first lens L1, to further improve the imaging quality of the optical system.

The optical system further includes a filter L8 having an object-side surface S15 and an image-side surface S16. Light from the object OBJ sequentially passes through the surfaces S1 to S16 and is finally imaged on the imaging surface S17. Further, the filter L8 is an infrared filter, configured to filter out infrared light in external light incident into the optical system to avoid imaging distortion. Specifically, the infrared filter L8 is made of glass. The infrared filter L8 may be part of the optical system and be assembled with each lens, or may be assembled in conjunction with the assembly of the optical system and the photosensitive element.

Table 1 shows surface types, curvature radii, thicknesses, materials, refractive indexes, Abbe numbers (i.e., dispersion coefficients) and effective focal lengths of the lenses of the optical system according to Embodiment 1. The curvature radii, the thicknesses and the effective focal lengths of the lenses are all in millimeters (mm). A reference wavelength is 555 nm.

TABLE 1

Embodiment 1
f = 6.8 mm, FNO = 1.88, FOV = 85.2°, TTL = 7.834 mm

| Surface number | Surface name | Surface type | Curvature radius | Thickness | Material | Refractive index | Abbe number | Focal length |
| --- | --- | --- | --- | --- | --- | --- | --- | --- |
| OBJ | Object surface | Spherical | Infinity | Infinity | | | | |
| STO | Diaphragm | Spherical | Infinity | −0.441 | | | | |
| S1 | First lens | Aspheric | 2.897 | 0.499 | Plastic | 1.55 | 56.11 | 10.94 |
| S2 | | Aspheric | 5.283 | 0.224 | | | | |
| S3 | Second lens | Aspheric | 7.904 | 0.750 | Plastic | 1.55 | 56.11 | 11.01 |
| S4 | | Aspheric | −24.240 | 0.030 | | | | |
| S5 | Third lens | Aspheric | 4.623 | 0.265 | Plastic | 1.68 | 19.25 | −12.92 |
| S6 | | Aspheric | 2.955 | 0.976 | | | | |

TABLE 1-continued

Embodiment 1
f = 6.8 mm, FNO = 1.88, FOV = 85.2°, TTL = 7.834 mm

| Surface number | Surface name | Surface type | Curvature radius | Thickness | Material | Refractive index | Abbe number | Focal length |
|---|---|---|---|---|---|---|---|---|
| S7 | Fourth lens | Aspheric | 13.549 | 0.469 | Plastic | 1.64 | 23.54 | 51.56 |
| S8 | | Aspheric | 22.565 | 0.662 | | | | |
| S9 | Fifth lens | Aspheric | −7.062 | 0.480 | Plastic | 1.55 | 56.11 | 7.95 |
| S10 | | Aspheric | −2.752 | 0.180 | | | | |
| S11 | Sixth lens | Aspheric | 4.607 | 0.393 | Plastic | 1.64 | 23.54 | −17.97 |
| S12 | | Aspheric | 3.186 | 1.100 | | | | |
| S13 | Seventh lens | Aspheric | 20.511 | 0.623 | Plastic | 1.55 | 56.11 | −6.08 |
| S14 | | Aspheric | 2.827 | 0.642 | | | | |
| S15 | Infrared filter | Spherical | Infinity | 0.210 | Glass | | | |
| S16 | | Spherical | Infinity | 0.330 | | | | |
| S17 | Imaging surface | Spherical | Infinity | 0.000 | | | | |

The aspheric surface types in each lens are defined by the following formula:

$$x = \frac{ch^2}{1 + \sqrt{1 - (k+1)c^2h^2}} + \Sigma A_i h^i \quad (1)$$

where x is a vector height of a distance from a vertex of an aspheric surface when the aspheric surface is at a position of a height h along the optical axis; c is paraxial curvature of the aspheric surface, c=1/R (i.e., the paraxial curvature c is the reciprocal of the curvature radius R in Table 1); k is a conic coefficient; and $A_i$ is an aspheric coefficient of the $i^{th}$ order. Table 2 below gives higher-order-term coefficients A4, A6, A8, A10, A12, A14, A16, A18 and A20 applicable to the aspheric surfaces S1 to S10 of the lenses in Embodiment 1.

In this embodiment, half of a diagonal length of an effective pixel region on the imaging surface S17 of the optical system, i.e., ImgH, is 6.34 mm. Therefore, it can be known from the data in Table 1 and Table 2 that the optical system in Embodiment 1 satisfies:

TTL/ImgH=1.24, where TTL is a distance on the optical axis from the object-side surface S1 of the first lens L1 to the imaging surface S17 of the optical system, and ImgH is half of a diagonal length of an effective pixel region on the imaging surface S17 of the optical system;

f/R14=2.41, where f is an effective focal length of the optical system, and R14 is a curvature radius of the image-side surface S14 of the seventh lens L7 at the optical axis;

FNO=1.88, where FNO is an f-number of the optical system;

f2/f=1.62, where f2 is an effective focal length of the second lens L2, and f is an effective focal length of the optical system;

TABLE 2

Embodiment 1
Aspheric coefficient

| Surface number | K | A4 A14 | A6 A16 | A8 A18 | A10 A20 | A12 |
|---|---|---|---|---|---|---|
| S1 | −2.9950E+00 | 8.8700E−03 −1.8000E−04 | −2.1400E−03 1.6000E−04 | −1.6700E−03 −4.0000E−05 | 1.0200E−03 0.0000E+00 | −2.7000E−04 |
| S2 | −1.6418E+01 | 5.5600E−03 1.6200E−03 | −6.3600E−03 −4.5000E−04 | −2.0600E−03 6.0000E−05 | 4.3900E−03 0.0000E+00 | −3.3300E−03 |
| S3 | −7.2810E+00 | 6.1000E−03 7.1300E−03 | −1.3000E−04 −2.2800E−03 | −8.7700E−03 4.0000E−04 | 1.5750E−02 −3.0000E−05 | −1.3390E−02 |
| S4 | −1.5001E+01 | 1.5160E−02 −6.7900E−03 | −2.4400E−02 2.0900E−03 | 2.7600E−02 −3.7000E−04 | −2.2760E−02 3.0000E−05 | 1.4610E−02 |
| S5 | −1.4962E+01 | −1.5620E−02 −1.4200E−03 | −1.0410E−02 4.5000E−04 | 1.5160E−02 −1.0000E−04 | −9.5600E−03 1.0000E−05 | 4.0300E−03 |
| S6 | −7.9477E+00 | −8.9700E−03 7.1800E−03 | 8.2700E−03 −1.9700E−05 | −1.3350E−02 2.9000E−04 | 1.8880E−02 −2.0000E−05 | −1.5150E−02 |
| S7 | −1.7510E+00 | −1.0750E−02 −1.1200E−03 | −5.6500E−03 2.2000E−04 | 8.4200E−03 −2.0000E−05 | −7.0200E−03 0.0000E+00 | 3.5400E−03 |
| S8 | −5.0000E+00 | −1.4300E−02 6.1000E−04 | 2.8900E−03 −1.2000E−04 | −4.8200E−03 1.0000E−05 | 3.8000E−03 0.0000E+00 | −1.9300E−03 |
| S9 | −3.2636E+00 | 1.8460E−02 2.7000E−04 | 4.7800E−03 −3.0000E−05 | −8.7700E−03 0.0000E+00 | 4.4700E−03 0.0000E+00 | −1.4000E−03 |
| S10 | −9.7467E+00 | 5.8500E−03 3.1000E−04 | 6.9700E−03 −3.0000E−05 | −9.3600E−03 0.0000E+00 | 5.0700E−03 0.0000E+00 | −1.6200E−03 |
| S11 | −6.7254E+00 | −8.0300E−03 5.0000E−05 | 1.0000E−05 0.0000E+00 | −2.5100E−03 0.0000E+00 | 1.2200E−03 0.0000E+00 | −3.3000E−04 |
| S12 | −1.5155E+01 | −1.1510E−02 2.0000E−05 | 3.8000E−03 0.0000E+00 | −2.7500E−03 0.0000E+00 | 8.8000E−04 0.0000E+00 | −1.7000E−04 |
| S13 | 4.7562E+00 | −9.3980E−02 0.0000E+00 | 2.4760E−02 0.0000E+00 | −3.9100E−03 0.0000E+00 | 4.2000E−04 0.0000E+00 | −3.0000E−05 |
| S14 | −1.2323E+01 | −4.2360E−02 0.0000E+00 | 9.4100E−03 0.0000E+00 | −1.3000E−03 0.0000E+00 | 1.2000E−04 0.0000E+00 | −1.0000E−05 |

Figure 2A:
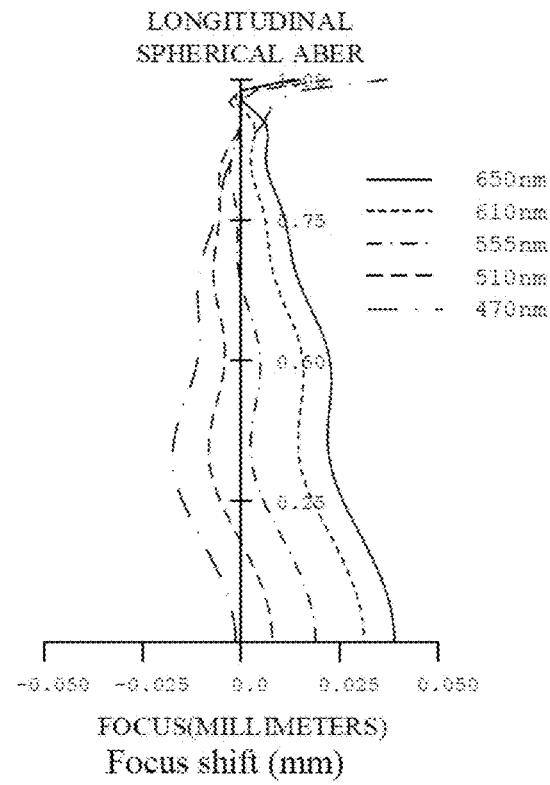
FIG. 2A to FIG. 2C show longitudinal spherical aberration curves, astigmatic field curves and distortion curves of the optical system according to Embodiment 1 respectively.
Figure 2B:
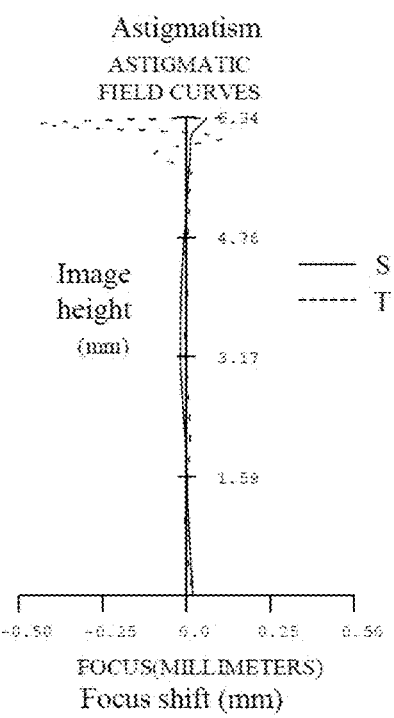
Figure 2C:
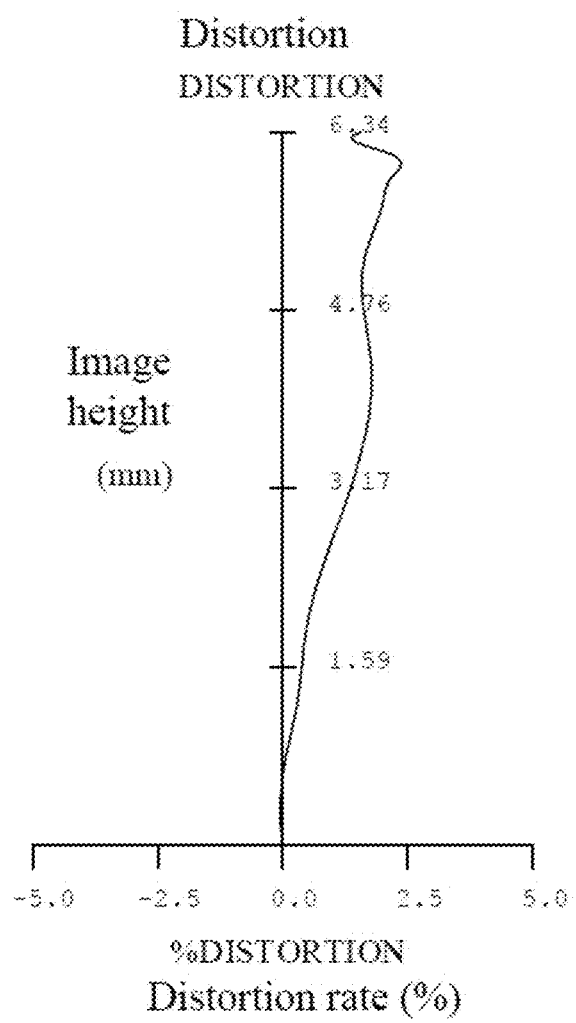

TTL/T34=8.02, where TTL is a distance on the optical axis from the object-side surface S1 of the first lens L1 to the imaging surface S17 of the optical system, and T34 is a distance on the optical axis from the image-side surface S6 of the third lens L3 to the object-side surface S7 of the fourth lens L4;

TTL/f=1.15, where TTL is a distance on the optical axis from the object-side surface S1 of the first lens L1 to the imaging surface S17 of the optical system, and f is an effective focal length of the optical system;

(R11+R12)/(R11−R12)=5.48, where R11 is a curvature radius of the object-side surface S11 of the sixth lens L6 at the optical axis, and R12 is a curvature radius of the image-side surface S12 of the sixth lens L6 at the optical axis;

TTL/CT7=12.57, where TTL is a distance on the optical axis from the object-side surface S1 of the first lens L1 to the imaging surface S17 of the optical system, and CT7 is a thickness of the seventh lens L7 on the optical axis;

FIG. 2A shows longitudinal spherical aberration curves of the optical system according to Embodiment 1, which respectively indicate focus shift of light with wavelengths of 470 nm, 510 nm, 555 nm, 610 nm and 650 nm after convergence through the optical system. FIG. 2B shows astigmatic field curves of the optical system according to Embodiment 1, which indicate curvature of a tangential image surface and curvature of a sagittal image surface. FIG. 2C shows distortion curves of the optical system according to Embodiment 1, which indicate distortion rates at different image heights. It may be known from FIG. 2A to FIG. 2C that the optical system according to Embodiment 1 can achieve good imaging quality.

Embodiment 2

Figure 3:
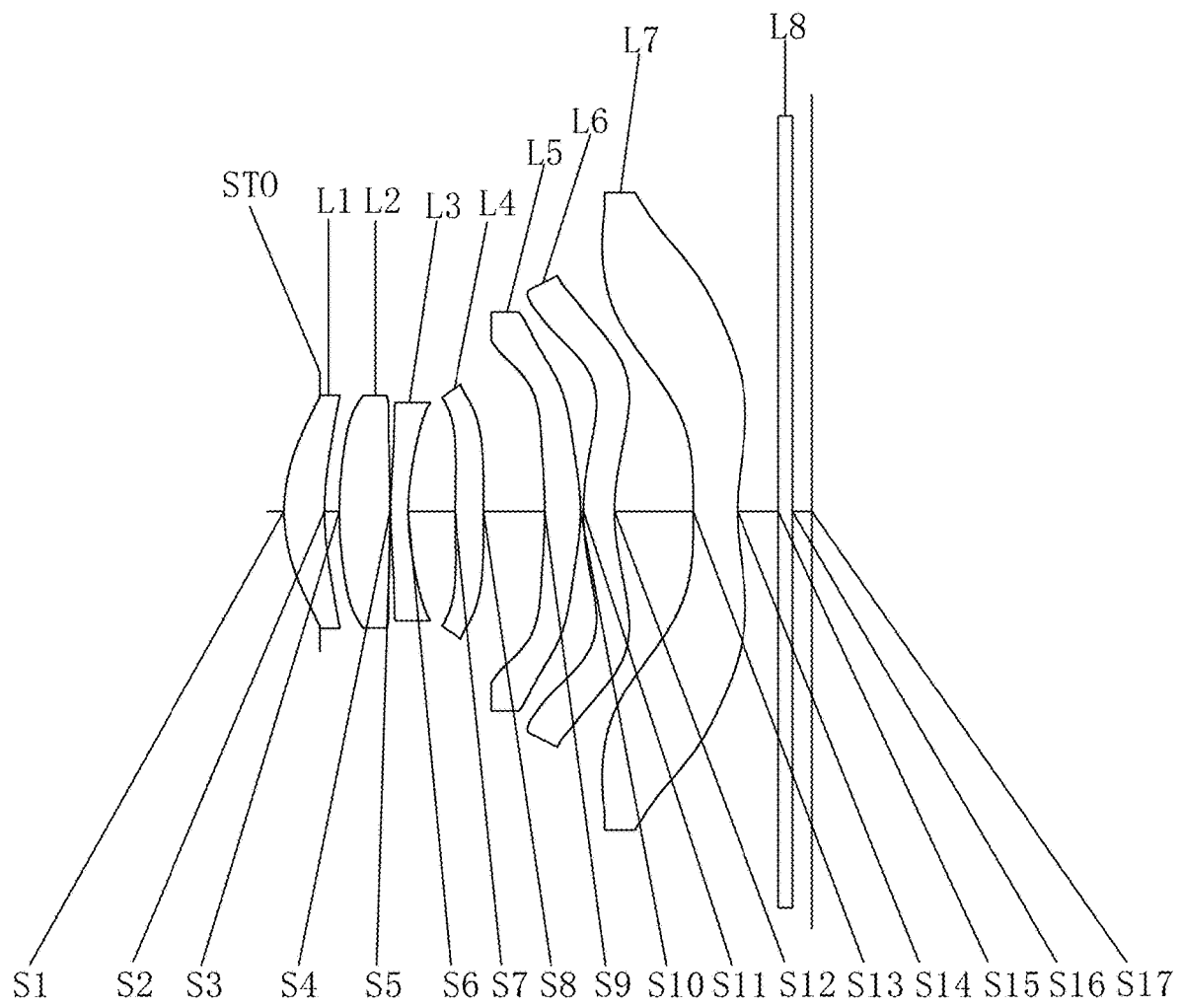
FIG. 3 is a schematic view of an optical system according to Embodiment 2 of the present disclosure.

An optical system according to Embodiment 2 of the present disclosure is described below with reference to FIG. 3 to FIG. 4C. In this embodiment, for brevity, the description similar to that of Embodiment 1 will be omitted. FIG. 3 is a schematic view of an optical system according to Embodiment 2 of the present disclosure.

As shown in FIG. 3, the optical system includes a first lens L1, a second lens L2, a third lens L3, a fourth lens L4, a fifth lens L5, a sixth lens L6, a seventh lens L7 and an imaging surface S17 in sequence from an object side to an image side along an optical axis.

The first lens L1 has positive refractive power, with an object-side surface S1 being convex at the optical axis and convex at the circumference and an image-side surface S2 being concave at the optical axis and concave at the circumference.

The second lens L2 has positive refractive power, with an object-side surface S3 being convex at the optical axis and convex at the circumference and an image-side surface S4 being convex at the optical axis and convex at the circumference.

The third lens L3 has negative refractive power, with an object-side surface S5 being convex at the optical axis and convex at the circumference and an image-side surface S6 being concave at the optical axis and concave at the circumference.

The fourth lens L4 has positive refractive power, with an object-side surface S7 being convex at the optical axis and concave at the circumference and an image-side surface S8 being convex at the optical axis and convex at the circumference.

The fifth lens L5 has positive refractive power, with an object-side surface S9 being concave at the optical axis and concave at the circumference and an image-side surface S10 being convex at the optical axis and convex at the circumference.

The sixth lens L6 has negative refractive power, with an object-side surface S11 being convex at the optical axis and concave at the circumference and an image-side surface S12 being concave at the optical axis and convex at the circumference.

The seventh lens L7 has negative refractive power, with an object-side surface S13 being concave at the optical axis and convex at the circumference and an image-side surface S14 being concave at the optical axis and convex at the circumference.

The object-side surface and the image-side surface of each of the first lens L1 to the seventh lens L7 are both aspheric. The design of aspheric surfaces can solve the problem of distortion of the field of view, and enable the lens to achieve an excellent optical imaging effect in the case of being smaller, thinner and flatter, so as to make the optical system have miniaturization characteristics.

The first lens L1 to the seventh lens L7 are all made of plastic. The lens made of plastic can reduce the weight of the optical system and can further reduce manufacturing costs.

A diaphragm STO is further arranged between an object OBJ and the first lens L1, to further improve the imaging quality of the optical system. The optical system further includes a filter L8 having an object-side surface S15 and an image-side surface S16. Light from the object OBJ sequentially passes through the surfaces S1 to S16 and is finally imaged on the imaging surface S17. Further, the filter L8 is an infrared filter, configured to filter out infrared light in external light incident into the optical system to avoid imaging distortion.

Table 3 shows surface types, curvature radii, thicknesses, materials, refractive indexes, Abbe numbers and effective focal lengths of the lenses of the optical system according to Embodiment 2, wherein the curvature radii, the thicknesses and the effective focal lengths of the lenses are all in millimeters (mm). Table 4 shows higher-order-term coefficients applicable to the aspheric surfaces S1 to S14 of the lenses in Embodiment 2, wherein the aspheric surface types may be defined by the formula (1) provided in Embodiment 1. Table 5 shows values of related parameters of the optical system according to Embodiment 2. A reference wavelength is 555 nm.

TABLE 3

Embodiment 2
f = 6.83 mm, FNO = 1.88, FOV = 84.9°, TTL = 7.834 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.526 | | | | |

TABLE 3-continued

Embodiment 2
f = 6.83 mm, FNO = 1.88, FOV = 84.9°, TTL = 7.834 mm

| Surface number | Surface name | Surface type | Curvature radius | Thickness | Material | Refractive index | Abbe number | Focal length |
|---|---|---|---|---|---|---|---|---|
| S1 | First lens | Aspheric | 2.756 | 0.597 | Plastic | 1.55 | 56.11 | 10.49 |
| S2 | | Aspheric | 4.907 | 0.219 | | | | |
| S3 | Second lens | Aspheric | 6.448 | 0.750 | Plastic | 1.55 | 56.11 | 10.59 |
| S4 | | Aspheric | −53.754 | 0.011 | | | | |
| S5 | Third lens | Aspheric | 6.871 | 0.260 | Plastic | 1.68 | 19.25 | −11.87 |
| S6 | | Aspheric | 3.649 | 0.700 | | | | |
| S7 | Fourth lens | Aspheric | 23.676 | 0.424 | Plastic | 1.64 | 23.54 | 33.74 |
| S8 | | Aspheric | −264.794 | 0.907 | | | | |
| S9 | Fifth lens | Aspheric | −7.721 | 0.531 | Plastic | 1.55 | 56.11 | 10.92 |
| S10 | | Aspheric | −3.446 | 0.045 | | | | |
| S11 | Sixth lens | Aspheric | 4.168 | 0.457 | Plastic | 1.64 | 23.54 | −27.49 |
| S12 | | Aspheric | 3.229 | 1.169 | | | | |
| S13 | Seventh lens | Aspheric | −44.642 | 0.657 | Plastic | 1.55 | 56.11 | −6.56 |
| S14 | | Aspheric | 3.915 | 0.609 | | | | |
| S15 | Infrared filter | Spherical | Infinity | 0.210 | Glass | | | |
| S16 | | Spherical | Infinity | 0.290 | | | | |
| S17 | Imaging surface | Spherical | Infinity | 0.000 | | | | |

TABLE 4

Embodiment 2
Aspheric coefficient

| Surface number | K | A4 A14 | A6 A16 | A8 A18 | A10 A20 | A12 |
|---|---|---|---|---|---|---|
| S1 | 0.0000E+00 | −5.3200E−03 −1.0500E−03 | 6.8000E−04 4.1000E−04 | −2.3200E−03 −8.0000E−05 | 1.7000E−04 1.0000E−05 | 1.1700E−03 |
| S2 | 0.0000E+00 | −8.6100E−03 2.6100E−03 | −1.2600E−03 −5.9000E−04 | −6.6800E−03 6.0000E−05 | 9.2800E−03 0.0000E+00 | −6.3900E−03 |
| S3 | 0.0000E+00 | −1.6600E−03 9.2600E−03 | 2.5700E−03 −2.7300E−03 | −1.4890E−02 4.4000E−04 | 2.3410E−02 −3.0000E−05 | −1.8800E−02 |
| S4 | 0.0000E+00 | −2.1360E−02 −6.9700E−03 | 3.8490E−02 3.1500E−03 | −3.4710E−02 −6.5000E−04 | 1.2940E−02 5.0000E−05 | 4.3900E−03 |
| S5 | 0.0000E+00 | −5.6620E−02 −3.3400E−03 | 4.8220E−02 1.6900E−03 | −3.3300E−02 −3.7000E−04 | 1.2360E−02 3.0000E−05 | 6.3000E−04 |
| S6 | 0.0000E+00 | −4.1830E−02 −4.0600E−03 | 2.0850E−02 1.4700E−03 | −3.8700E−03 −3.0000E−04 | −5.4800E−03 3.0000E−05 | 6.7800E−03 |
| S7 | 0.0000E+00 | −1.7250E−02 −5.1300E−03 | −1.1380E−02 1.1000E−03 | 1.9400E−02 −1.2000E−04 | −2.1120E−02 0.0000E+00 | 1.3500E−02 |
| S8 | 0.0000E+00 | −1.7350E−02 3.4200E−03 | −4.0000E−05 −9.3000E−04 | −6.9200E−03 1.4000E−04 | 9.6300E−03 −1.0000E−05 | −7.4400E−03 |
| S9 | 0.0000E+00 | 2.1270E−02 5.0000E−05 | 6.7200E−03 0.0000E+00 | −1.0110E−02 0.0000E+00 | 3.6600E−03 0.0000E+00 | −6.7000E−04 |
| S10 | −1.0000E+00 | 4.7790E−02 1.6000E−04 | 3.6000E−04 −1.0000E−05 | −9.7600E−03 0.0000E+00 | 4.3900E−03 0.0000E+00 | −1.0700E−03 |
| S11 | 0.0000E+00 | −1.9290E−02 4.0000E−05 | 5.4100E−03 0.0000E+00 | −4.4900E−03 0.0000E+00 | 1.4700E−03 0.0000E+00 | −3.0000E−04 |
| S12 | −1.0000E+00 | −4.9100E−02 4.0000E−05 | 2.0290E−02 0.0000E+00 | −8.4400E−03 0.0000E+00 | 2.1700E−03 0.0000E+00 | −3.6000E−04 |
| S13 | 0.0000E+00 | −4.7410E−02 0.0000E+00 | 7.0000E−03 0.0000E+00 | −6.5000E−04 0.0000E+00 | 7.0000E−05 0.0000E+00 | −1.0000E−05 |
| S14 | −1.0000E+00 | −4.8030E−02 0.0000E+00 | 9.2800E−03 0.0000E+00 | −1.6400E−03 0.0000E+00 | 2.2000E−04 0.0000E+00 | −2.0000E−05 |

TABLE 5

| | | | |
|---|---|---|---|
| f (mm) | 6.83 | f/R14 | 1.74 |
| FNO | 1.88 | f2/f | 1.55 |
| FOV (°) | 84.9 | TTL/T34 | 11.19 |
| ImgH (mm) | 6.34 | TTL/f | 1.15 |
| TTL (mm) | 7.83 | (R11 + R12)/(R11 − R12) | 7.88 |
| TTL/ImgH | 1.24 | TTL/CT7 | 11.93 |

Figure 4A:
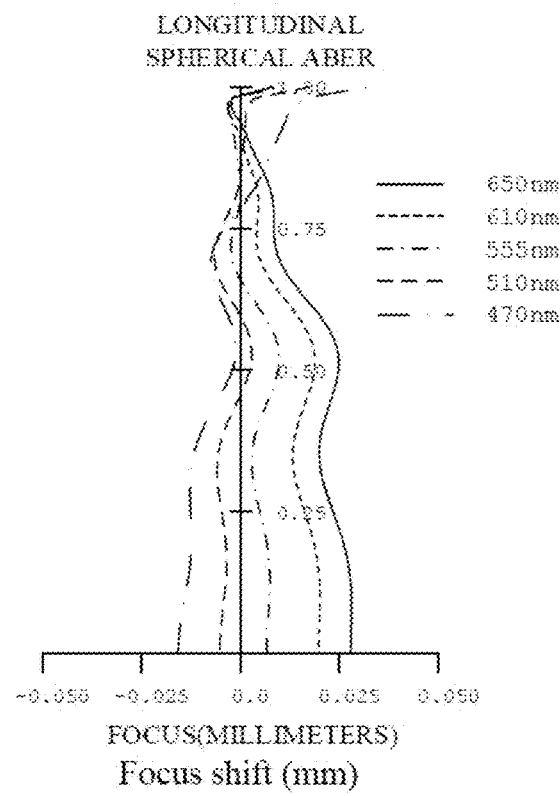
FIG. 4A to FIG. 4C show longitudinal spherical aberration curves, astigmatic field curves and distortion curves of the optical system according to Embodiment 2 respectively.
Figure 4B:
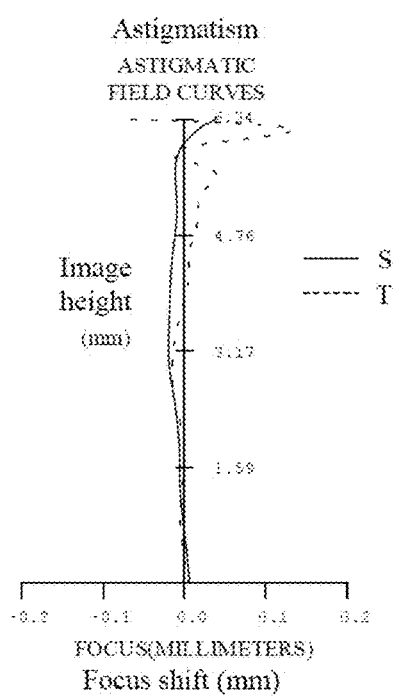
Figure 4C:
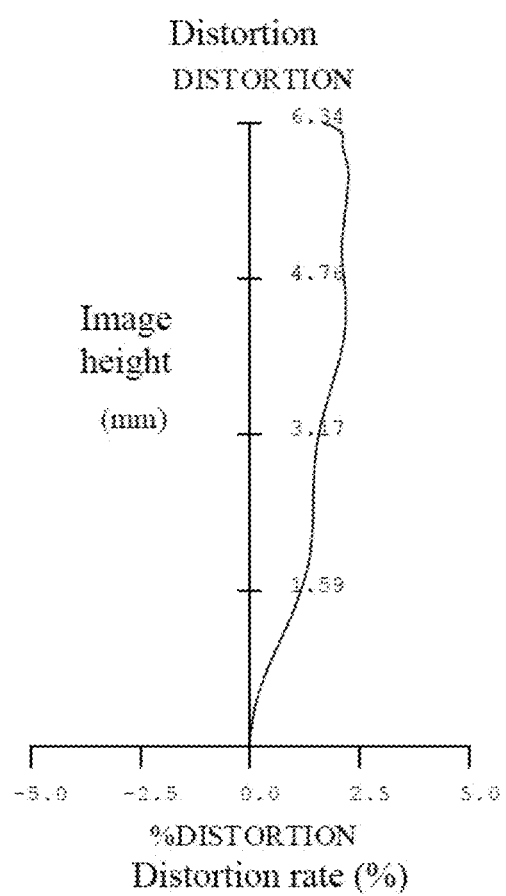

FIG. 4A shows longitudinal spherical aberration curves of the optical system according to Embodiment 2, which respectively indicate focus shift of light with different wavelengths after convergence through the optical system. FIG. 4B shows astigmatic field curves of the optical system according to Embodiment 2, which indicate curvature of a tangential image surface and curvature of a sagittal image surface. FIG. 4C shows distortion curves of the optical system according to Embodiment 2, which indicate distortion rates at different image heights. It may be known from FIG. 4A to FIG. 4C that the optical system according to Embodiment 2 can achieve good imaging quality.

Embodiment 3

Figure 5:
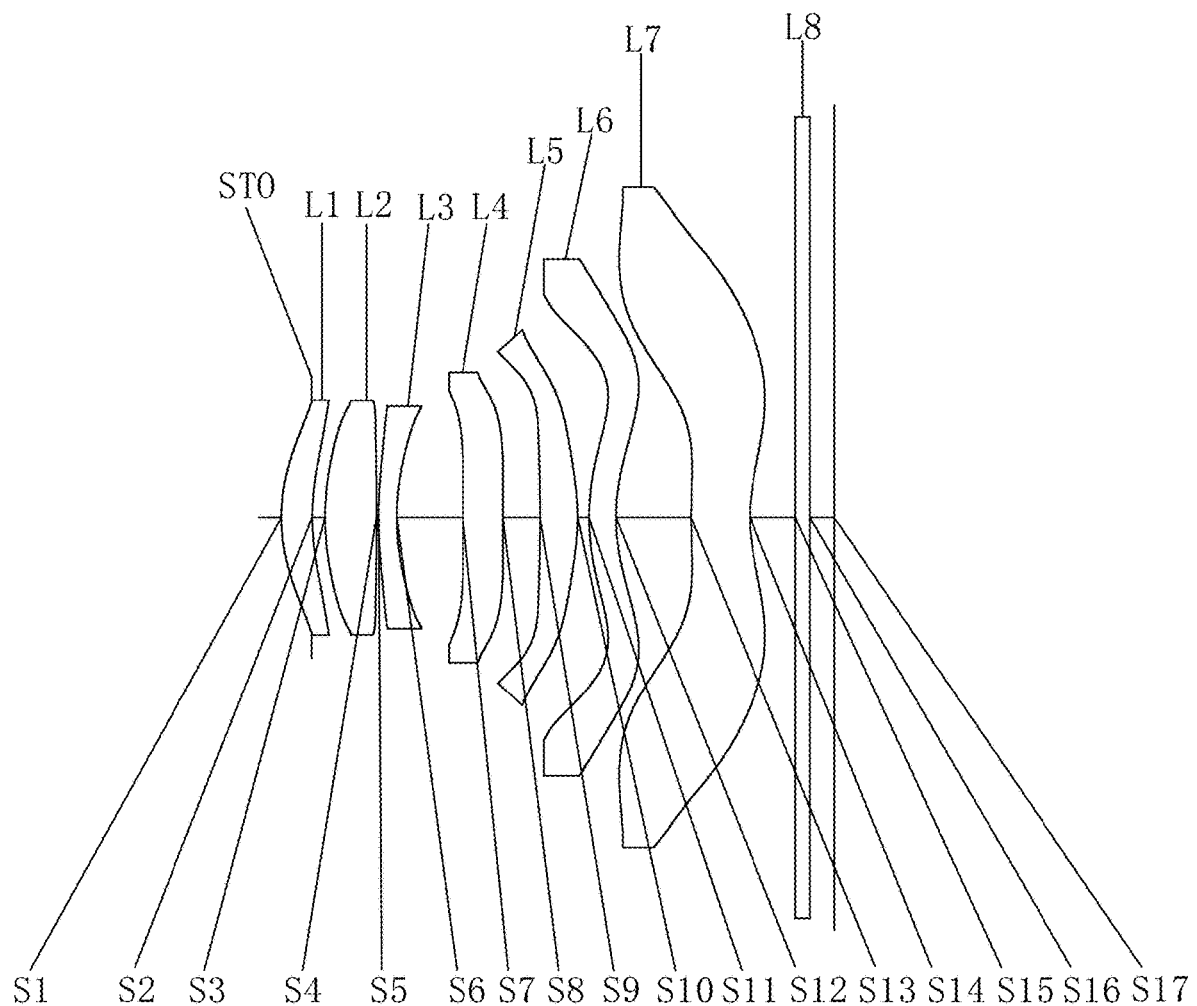
FIG. 5 is a schematic view of an optical system according to Embodiment 3 of the present disclosure.

An optical system according to Embodiment 3 of the present disclosure is described below with reference to FIG. 5 to FIG. 6C. In this embodiment, for brevity, the description similar to that of Embodiment 1 will be omitted. FIG. 5 is a schematic view of an optical system according to Embodiment 3 of the present disclosure.

As shown in FIG. 5, the optical system includes a first lens L1, a second lens L2, a third lens L3, a fourth lens L4, a fifth lens L5, a sixth lens L6, a seventh lens L7 and an imaging surface S17 in sequence from an object side to an image side along an optical axis.

The first lens L1 has positive refractive power, with an object-side surface S1 being convex at the optical axis and convex at the circumference and an image-side surface S2 being concave at the optical axis and concave at the circumference.

The second lens L2 has positive refractive power, with an object-side surface S3 being convex at the optical axis and convex at the circumference and an image-side surface S4 being concave at the optical axis and convex at the circumference.

The third lens L3 has negative refractive power, with an object-side surface S5 being convex at the optical axis and convex at the circumference and an image-side surface S6 being concave at the optical axis and concave at the circumference.

The fourth lens L4 has negative refractive power, with an object-side surface S7 being convex at the optical axis and concave at the circumference and an image-side surface S8 being concave at the optical axis and convex at the circumference.

The fifth lens L5 has positive refractive power, with an object-side surface S9 being concave at the optical axis and concave at the circumference and an image-side surface S10 being convex at the optical axis and convex at the circumference.

The sixth lens L6 has negative refractive power, with an object-side surface S11 being convex at the optical axis and concave at the circumference and an image-side surface S12 being concave at the optical axis and convex at the circumference.

The seventh lens L7 has negative refractive power, with an object-side surface S13 being convex at the optical axis and convex at the circumference and an image-side surface S14 being concave at the optical axis and convex at the circumference.

The object-side surface and the image-side surface of each of the first lens L1 to the seventh lens L7 are both aspheric. The design of aspheric surfaces can solve the problem of distortion of the field of view, and enable the lens to achieve an excellent optical imaging effect in the case of being smaller, thinner and flatter, so as to make the optical system have miniaturization characteristics.

The first lens L1 to the seventh lens L7 are all made of plastic. The lens made of plastic can reduce the weight of the optical system and can further reduce manufacturing costs.

A diaphragm STO is further arranged between an object OBJ and the first lens L1, to further improve the imaging quality of the optical system. The optical system further includes a filter L8 having an object-side surface S15 and an image-side surface S16. Light from the object OBJ sequentially passes through the surfaces S1 to S16 and is finally imaged on the imaging surface S17. Further, the filter L8 is an infrared filter, configured to filter out infrared light in external light incident into the optical system to avoid imaging distortion.

Table 6 shows surface types, curvature radii, thicknesses, materials, refractive indexes, Abbe numbers and effective focal lengths of the lenses of the optical system according to Embodiment 3, wherein the curvature radii, the thicknesses and the effective focal lengths of the lenses are all in millimeters (mm). Table 7 shows higher-order-term coefficients applicable to the aspheric surfaces S1 to S14 of the lenses in Embodiment 3, wherein the aspheric surface types may be defined by the formula (1) provided in Embodiment 1. Table 8 shows values of related parameters of the optical system according to Embodiment 3. A reference wavelength is 555 nm.

TABLE 6

Embodiment 3
f = 6.79 mm, FNO = 1.88, FOV = 84.8°, TTL = 8.1 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.443 | | | | |
| S1 | First lens | Aspheric | 2.910 | 0.452 | Plastic | 1.55 | 56.11 | 17.72 |
| S2 | | Aspheric | 3.934 | 0.187 | | | | |
| S3 | Second lens | Aspheric | 4.358 | 0.750 | Plastic | 1.55 | 56.11 | 8.02 |
| S4 | | Aspheric | 995.000 | 0.030 | | | | |
| S5 | Third lens | Aspheric | 6.074 | 0.265 | Plastic | 1.68 | 19.25 | −13.70 |
| S6 | | Aspheric | 3.607 | 0.970 | | | | |
| S7 | Fourth lens | Aspheric | 35.000 | 0.589 | Plastic | 1.64 | 23.54 | −333.40 |
| S8 | | Aspheric | 29.900 | 0.548 | | | | |
| S9 | Fifth lens | Aspheric | −20.047 | 0.546 | Plastic | 1.55 | 56.11 | 8.34 |
| S10 | | Aspheric | −3.747 | 0.171 | | | | |
| S11 | Sixth lens | Aspheric | 4.179 | 0.390 | Plastic | 1.64 | 23.54 | −22.25 |
| S12 | | Aspheric | 3.118 | 1.100 | | | | |
| S13 | Seventh lens | Aspheric | 9.166 | 0.859 | Plastic | 1.55 | 56.11 | −7.76 |
| S14 | | Aspheric | 2.801 | 0.672 | | | | |
| S15 | Infrared filter | Spherical | Infinity | 0.210 | Glass | | | |
| S16 | | Spherical | Infinity | 0.360 | | | | |
| S17 | Imaging surface | Spherical | Infinity | 0.000 | | | | |

TABLE 7

Embodiment 3
Aspheric coefficient

| Surface number | K | A4<br>A14 | A6<br>A16 | A8<br>A18 | A10<br>A20 | A12 |
|---|---|---|---|---|---|---|
| S1 | −3.1995E+00 | 8.5700E−03<br>2.6000E−04 | −2.5100E−03<br>−3.0000E−05 | −1.5000E−03<br>0.0000E+00 | 1.4600E−03<br>0.0000E+00 | −8.6000E−04 |
| S2 | −1.4187E+01 | 1.4910E−02<br>9.2000E−04 | −1.6790E−02<br>−3.1000E−04 | 4.7900E−03<br>5.0000E−05 | 5.3000E−04<br>0.0000E+00 | −1.4000E−03 |
| S3 | −1.4864E+01 | 1.8610E−02<br>4.5100E−03 | −1.0020E−02<br>−1.4900E−03 | −2.0500E−03<br>2.7000E−04 | 9.1500E−03<br>−2.0000E−05 | −8.2500E−03 |
| S4 | −1.5001E+01 | −1.1950E−02<br>−4.7100E−03 | 1.0770E−02<br>1.7100E−03 | −4.5400E−03<br>−3.2000E−04 | −3.5000E−03<br>2.0000E−05 | 6.8300E−03 |
| S5 | −1.3954E+01 | −2.9680E−02<br>−5.2000E−03 | 1.5670E−02<br>1.7600E−03 | 2.0000E−05<br>−3.3000E−04 | −8.9300E−03<br>2.0000E−05 | 9.1900E−03 |
| S6 | −6.6497E+00 | −9.5800E−03<br>−4.7000E−03 | 3.5900E−03<br>1.4500E−03 | 8.8600E−03<br>−2.5000E−04 | −1.2840E−02<br>2.0000E−05 | 9.7400E−03 |
| S7 | −1.5000E+01 | −2.0600E−02<br>1.9700E−03 | 7.4500E−03<br>−4.9000E−04 | −9.5100E−03<br>7.0000E−05 | 8.3500E−03<br>0.0000E+00 | −5.0100E−03 |
| S8 | −1.1249E+01 | −2.6620E−02<br>1.8700E−03 | 1.6670E−02<br>−3.5000E−04 | −1.9120E−02<br>4.0000E−05 | 1.3440E−02<br>0.0000E+00 | −6.2000E−03 |
| S9 | 5.0000E+00 | −3.8100E−03<br>8.0000E−04 | 2.6180E−02<br>−1.0000E−04 | −2.5030E−02<br>1.0000E−05 | 1.2330E−02<br>0.0000E+00 | −3.9100E−03 |
| S10 | −1.3013E+01 | 1.3650E−02<br>3.1000E−04 | 3.2300E−03<br>−4.0000E−05 | −9.0000E−03<br>0.0000E+00 | 5.0900E−03<br>0.0000E+00 | −1.6200E−03 |
| S11 | −3.5512E+00 | 1.9940E−02<br>−1.0000E−05 | −1.6710E−02<br>0.0000E+00 | 4.3100E−03<br>0.0000E+00 | −7.7000E−04<br>0.0000E+00 | 9.0000E−05 |
| S12 | −1.1414E+01 | 1.8820E−02<br>0.0000E+00 | −1.0800E−02<br>0.0000E+00 | 1.9300E−03<br>0.0000E+00 | −1.9000E−04<br>0.0000E+00 | 0.0000E+00 |
| S13 | −1.2937E+01 | −5.2370E−02<br>0.0000E+00 | 6.2700E−03<br>0.0000E+00 | −3.1000E−04<br>0.0000E+00 | 2.0000E−05<br>0.0000E+00 | 0.0000E+00 |
| S14 | −6.4031E+00 | −2.6390E−02<br>0.0000E+00 | 3.8300E−03<br>0.0000E+00 | −5.1000E−04<br>0.0000E+00 | 5.0000E−05<br>0.0000E+00 | 0.0000E+00 |

TABLE 8

| f (mm) | 6.79 | f/R14 | 2.42 |
|---|---|---|---|
| FNO | 1.88 | f2/f | 1.18 |
| FOV (°) | 84.8 | TTL/T34 | 8.35 |
| ImgH (mm) | 6.34 | TTL/f | 1.19 |
| TTL (mm) | 8.1 | (R11 + R12)/(R11 − R12) | 6.88 |
| TTL/ImgH | 1.28 | TTL/CT7 | 9.43 |

Figure 6A:
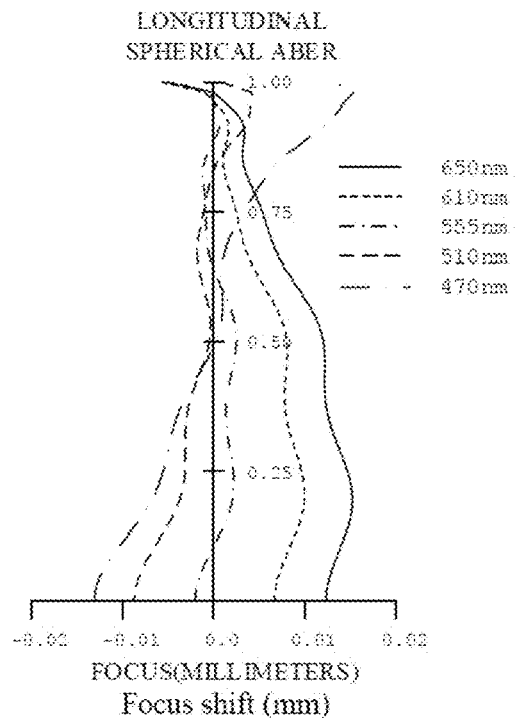
FIG. 6A to FIG. 6C show longitudinal spherical aberration curves, astigmatic field curves and distortion curves of the optical system according to Embodiment 3 respectively.
Figure 6B:
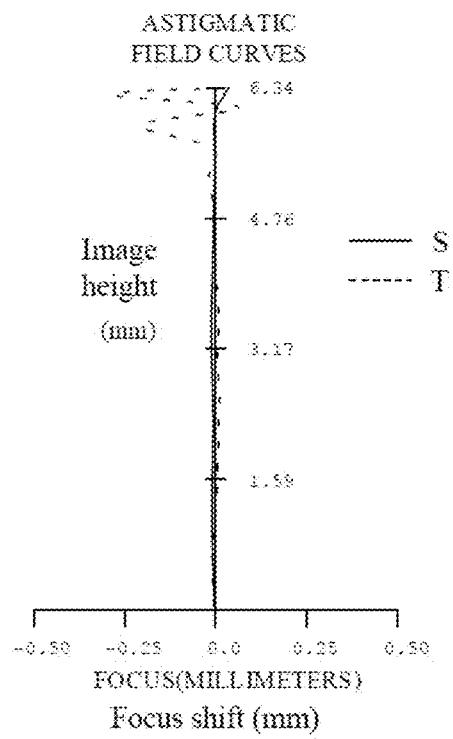
Figure 6C:
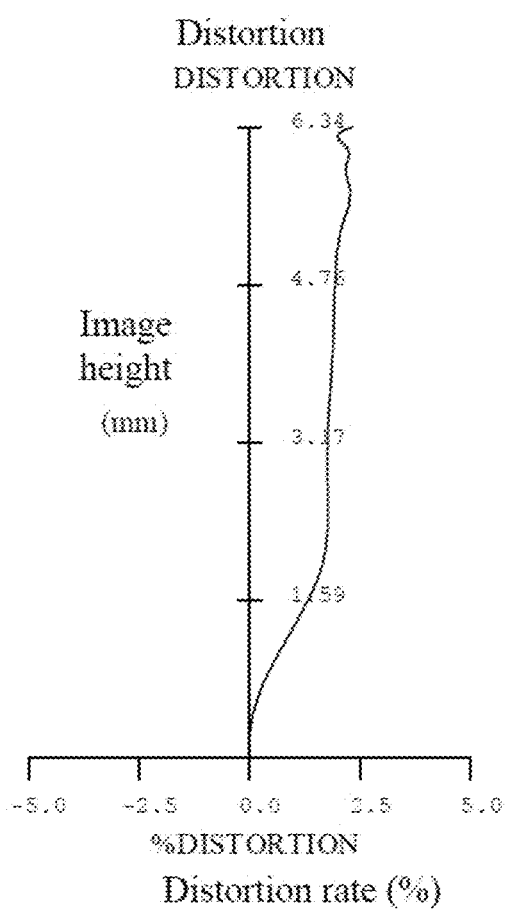

FIG. 6A shows longitudinal spherical aberration curves of the optical system according to Embodiment 3, which respectively indicate focus shift of light with different wavelengths after convergence through the optical system. FIG. 6B shows astigmatic field curves of the optical system according to Embodiment 3, which indicate curvature of a tangential image surface and curvature of a sagittal image surface. FIG. 6C shows distortion curves of the optical system according to Embodiment 3, which indicate distortion rates at different image heights. It may be known from FIG. 6A to FIG. 6C that the optical system according to Embodiment 3 can achieve good imaging quality.

Embodiment 4

Figure 7:
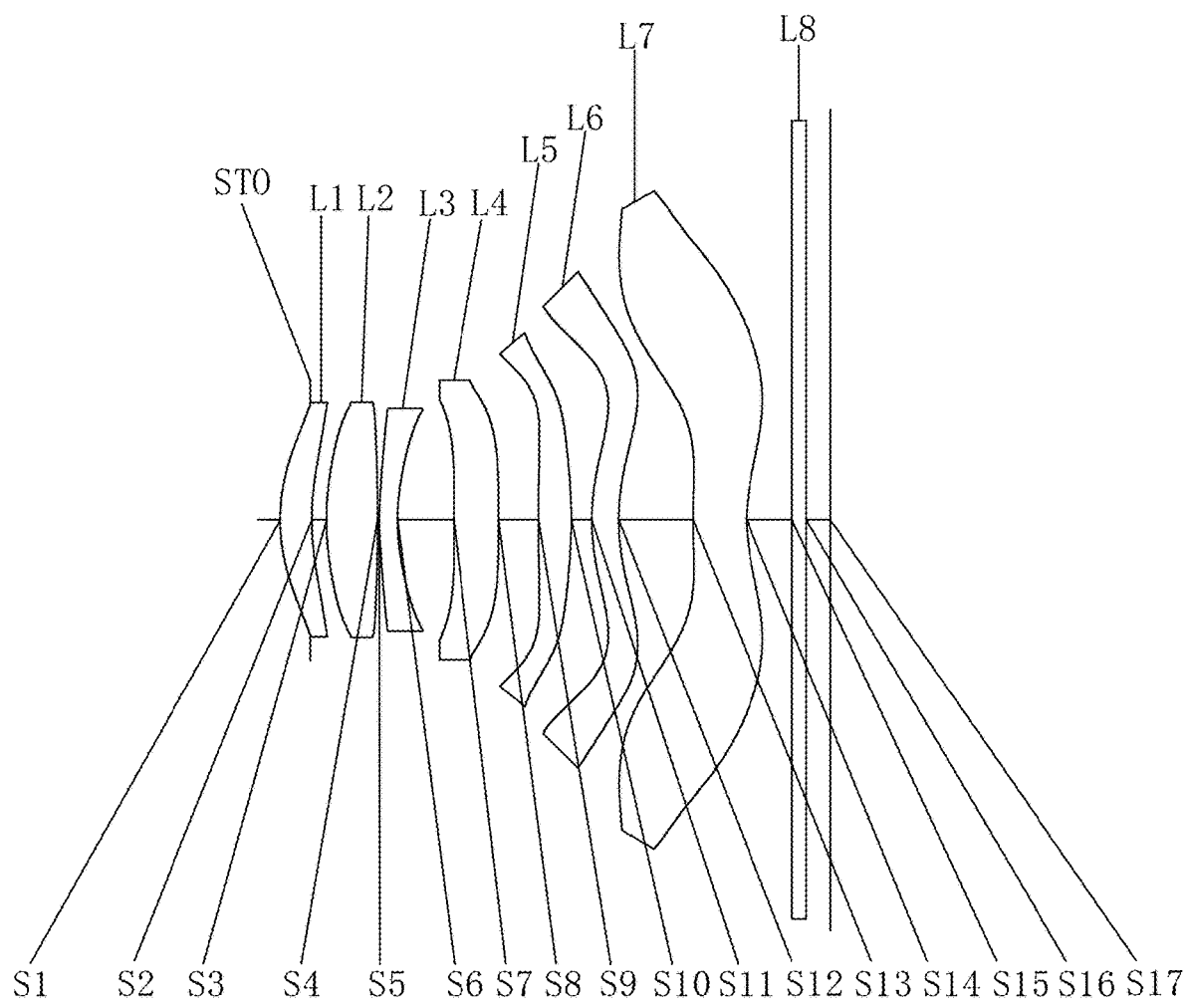
FIG. 7 is a schematic view of an optical system according to Embodiment 4 of the present disclosure.

An optical system according to Embodiment 4 of the present disclosure is described below with reference to FIG. 7 to FIG. 8C. In this embodiment, for brevity, the description similar to that of Embodiment 1 will be omitted. FIG. 7 is a schematic view of an optical system according to Embodiment 4 of the present disclosure.

As shown in FIG. 7, the optical system includes a first lens L1, a second lens L2, a third lens L3, a fourth lens L4, a fifth lens L5, a sixth lens L6, a seventh lens L7 and an imaging surface S17 in sequence from an object side to an image side along an optical axis.

The first lens L1 has positive refractive power, with an object-side surface S1 being convex at the optical axis and convex at the circumference and an image-side surface S2 being concave at the optical axis and concave at the circumference.

The second lens L2 has positive refractive power, with an object-side surface S3 being convex at the optical axis and convex at the circumference and an image-side surface S4 being convex at the optical axis and convex at the circumference.

The third lens L3 has negative refractive power, with an object-side surface S5 being convex at the optical axis and convex at the circumference and an image-side surface S6 being concave at the optical axis and concave at the circumference.

The fourth lens L4 has positive refractive power, with an object-side surface S7 being concave at the optical axis and concave at the circumference and an image-side surface S8 being convex at the optical axis and convex at the circumference.

The fifth lens L5 has positive refractive power, with an object-side surface S9 being convex at the optical axis and concave at the circumference and an image-side surface S10 being convex at the optical axis and convex at the circumference.

The sixth lens L6 has positive refractive power, with an object-side surface S11 being convex at the optical axis and concave at the circumference and an image-side surface S12 being concave at the optical axis and convex at the circumference.

The seventh lens L7 has negative refractive power, with an object-side surface S13 being convex at the optical axis and convex at the circumference and an image-side surface S14 being concave at the optical axis and convex at the circumference.

The object-side surface and the image-side surface of each of the first lens L1 to the seventh lens L7 are both aspheric. The design of aspheric surfaces can solve the problem of distortion of the field of view, and enable the lens to achieve an excellent optical imaging effect in the case of being smaller, thinner and flatter, so as to make the optical system have miniaturization characteristics.

The first lens L1 to the seventh lens L7 are all made of plastic. The lens made of plastic can reduce the weight of the optical system and can further reduce manufacturing costs.

A diaphragm STO is further arranged between an object OBJ and the first lens L1, to further improve the imaging quality of the optical system. The optical system further includes a filter L8 having an object-side surface S15 and an image-side surface S16. Light from the object OBJ sequentially passes through the surfaces S1 to S16 and is finally imaged on the imaging surface S17. Further, the filter L8 is an infrared filter, configured to filter out infrared light in external light incident into the optical system to avoid imaging distortion.

Table 9 shows surface types, curvature radii, thicknesses, materials, refractive indexes, Abbe numbers and effective focal lengths of the lenses of the optical system according to Embodiment 4, wherein the curvature radii, the thicknesses and the effective focal lengths of the lenses are all in millimeters (mm). Table 10 shows higher-order-term coefficients applicable to the aspheric surfaces S1 to S14 of the lenses in Embodiment 4, wherein the aspheric surface types may be defined by the formula (1) provided in Embodiment 1. Table 11 shows values of related parameters of the optical system according to Embodiment 4. A reference wavelength is 555 nm.

TABLE 9

Embodiment 4
f = 6.79 mm, FNO = 1.88, FOV = 84.9°, TTL = 8.1 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.441 | | | | |
| S1 | First lens | Aspheric | 2.964 | 0.466 | Plastic | 1.55 | 56.11 | 15.79 |
| S2 | | Aspheric | 4.265 | 0.215 | | | | |
| S3 | Second lens | Aspheric | 4.580 | 0.750 | Plastic | 1.55 | 56.11 | 7.81 |
| S4 | | Aspheric | −57.892 | 0.030 | | | | |
| S5 | Third lens | Aspheric | 6.550 | 0.265 | Plastic | 1.68 | 19.25 | −11.48 |
| S6 | | Aspheric | 3.498 | 0.832 | | | | |
| S7 | Fourth lens | Aspheric | −990.000 | 0.658 | Plastic | 1.64 | 23.54 | 300.69 |
| S8 | | Aspheric | −162.129 | 0.588 | | | | |
| S9 | Fifth lens | Aspheric | 60.003 | 0.480 | Plastic | 1.55 | 56.11 | 13.46 |
| S10 | | Aspheric | −8.347 | 0.305 | | | | |
| S11 | Sixth lens | Aspheric | 3.742 | 0.394 | Plastic | 1.64 | 23.54 | 337.45 |
| S12 | | Aspheric | 3.650 | 1.090 | | | | |
| S13 | Seventh lens | Aspheric | 10.365 | 0.791 | Plastic | 1.55 | 56.11 | −7.45 |
| S14 | | Aspheric | 2.841 | 0.669 | | | | |
| S15 | Infrared filter | Spherical | Infinity | 0.210 | Glass | | | |
| S16 | | Spherical | Infinity | 0.357 | | | | |
| S17 | Imaging surface | Spherical | Infinity | 0.000 | | | | |

TABLE 10

Embodiment 4
Aspheric coefficient

| Surface number | K | A4 A14 | A6 A16 | A8 A18 | A10 A20 | A12 |
|---|---|---|---|---|---|---|
| S1 | −3.1632E+00 | 7.9200E−03 −1.6000E−04 | −2.4000E−03 9.0000E−05 | −8.2000E−04 −2.0000E−05 | 4.4000E−04 0.0000E+00 | −2.0000E−05 |
| S2 | −1.5326E+01 | 1.0430E−02 3.2000E−04 | −1.3380E−02 −1.0000E−04 | 4.3300E−03 1.0000E−05 | −3.6000E−04 0.0000E+00 | −4.0000E−04 |
| S3 | −1.7086E+01 | 1.6490E−02 3.9100E−03 | −9.3700E−03 −1.2700E−03 | −1.4100E−03 2.2000E−04 | 8.0300E−03 −2.0000E−05 | −7.2800E−03 |
| S4 | −1.5001E+01 | −1.4290E−02 −6.5000E−04 | 2.3060E−02 6.6000E−04 | −2.4200E−02 −1.6000E−04 | 1.4060E−02 1.0000E−05 | −3.4400E−03 |
| S5 | −1.3689E+01 | −3.6170E−02 −1.8000E−03 | 3.3440E−02 9.2000E−04 | −2.2590E−02 −2.0000E−04 | 8.6700E−03 2.0000E−05 | −8.0000E−05 |
| S6 | −6.6351E+00 | −1.2860E−02 −5.1100E−03 | 1.0150E−02 1.5600E−03 | 4.0300E−03 −2.7000E−04 | −1.1580E−02 2.0000E−05 | 1.0160E−02 |
| S7 | −1.5000E+01 | −2.0500E−02 3.1100E−03 | 7.1200E−03 −8.5000E−04 | −1.0320E−02 1.3000E−04 | 1.0470E−02 −1.0000E−05 | −7.1100E−03 |
| S8 | −1.5000E+01 | −2.5300E−02 1.6300E−03 | 1.0780E−02 −3.3000E−04 | −1.3250E−02 4.0000E−05 | 1.0130E−02 0.0000E+00 | −5.0500E−03 |
| S9 | −1.5000E+01 | −5.1200E−03 4.8000E−04 | 1.5310E−02 −6.0000E−05 | −1.5250E−02 0.0000E+00 | 7.4800E−03 0.0000E+00 | −2.3700E−03 |
| S10 | −5.0037E+00 | 7.4000E−04 3.1000E−04 | 1.2250E−02 −4.0000E−05 | −1.1780E−02 0.0000E+00 | 5.5600E−03 0.0000E+00 | −1.6700E−03 |
| S11 | −5.0836E+00 | 4.4600E−03 6.0000E−05 | −7.2100E−03 −1.0000E−05 | −4.1000E−04 0.0000E+00 | 9.7000E−04 0.0000E+00 | −3.3000E−04 |
| S12 | −1.1410E+01 | 2.4000E−02 −1.0000E−05 | −1.8450E−02 0.0000E+00 | 5.2900E−03 0.0000E+00 | −9.7000E−04 0.0000E+00 | 1.1000E−04 |

TABLE 10-continued

Embodiment 4
Aspheric coefficient

| Surface number | K | A4 A14 | A6 A16 | A8 A18 | A10 A20 | A12 |
|---|---|---|---|---|---|---|
| S13 | −1.3166E+01 | −4.4990E−02 0.0000E+00 | 2.5500E−03 0.0000E+00 | 6.2000E−04 0.0000E+00 | −1.1000E−04 0.0000E+00 | 1.0000E−05 |
| S14 | −5.3064E+00 | −2.6830E−02 0.0000E+00 | 3.4400E−03 0.0000E+00 | −3.7000E−04 0.0000E+00 | 3.0000E−05 0.0000E+00 | 0.0000E+00 |

TABLE 11

| f (mm) | 6.78 | f/R14 | 2.39 |
|---|---|---|---|
| FNO | 1.88 | f2/f | 1.15 |
| FOV (°) | 84.9 | TTL/T34 | 9.73 |
| ImgH (mm) | 6.34 | TTL/f | 1.19 |
| TTL (mm) | 8.1 | (R11 + R12)/(R11 − R12) | 80.72 |
| TTL/ImgH | 1.28 | TTL/CT7 | 10.24 |

Figure 8A:
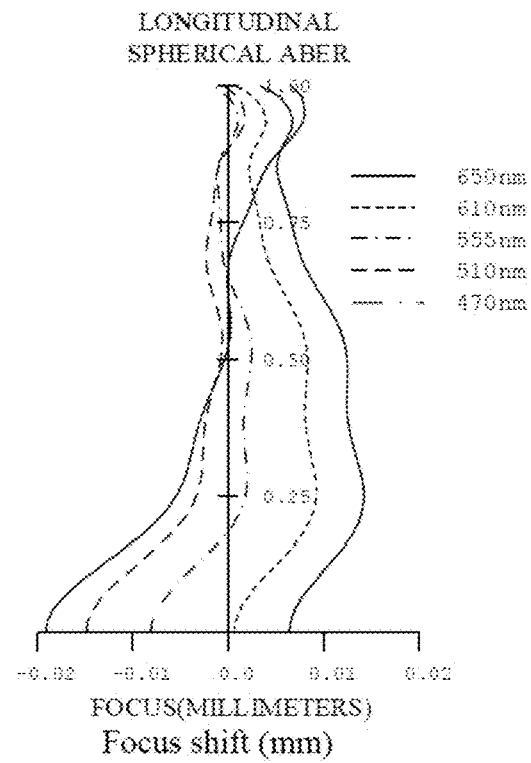
FIG. 8A to FIG. 8C show longitudinal spherical aberration curves, astigmatic field curves and distortion curves of the optical system according to Embodiment 4 respectively.
Figure 8B:
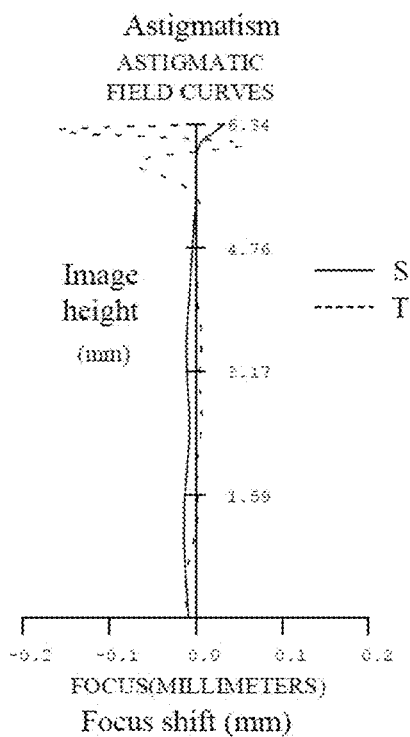
Figure 8C:
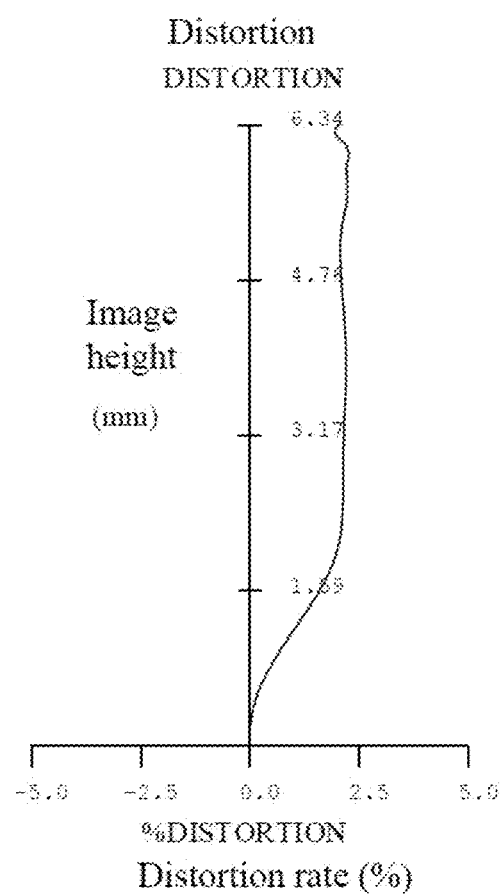

FIG. 8A shows longitudinal spherical aberration curves of the optical system according to Embodiment 4, which respectively indicate focus shift of light with different wavelengths after convergence through the optical system. FIG. 8B shows astigmatic field curves of the optical system according to Embodiment 4, which indicate curvature of a tangential image surface and curvature of a sagittal image surface. FIG. 8C shows distortion curves of the optical system according to Embodiment 4, which indicate distortion rates at different image heights. It may be known from FIG. 8A to FIG. 8C that the optical system according to Embodiment 4 can achieve good imaging quality.

Embodiment 5

Figure 9:
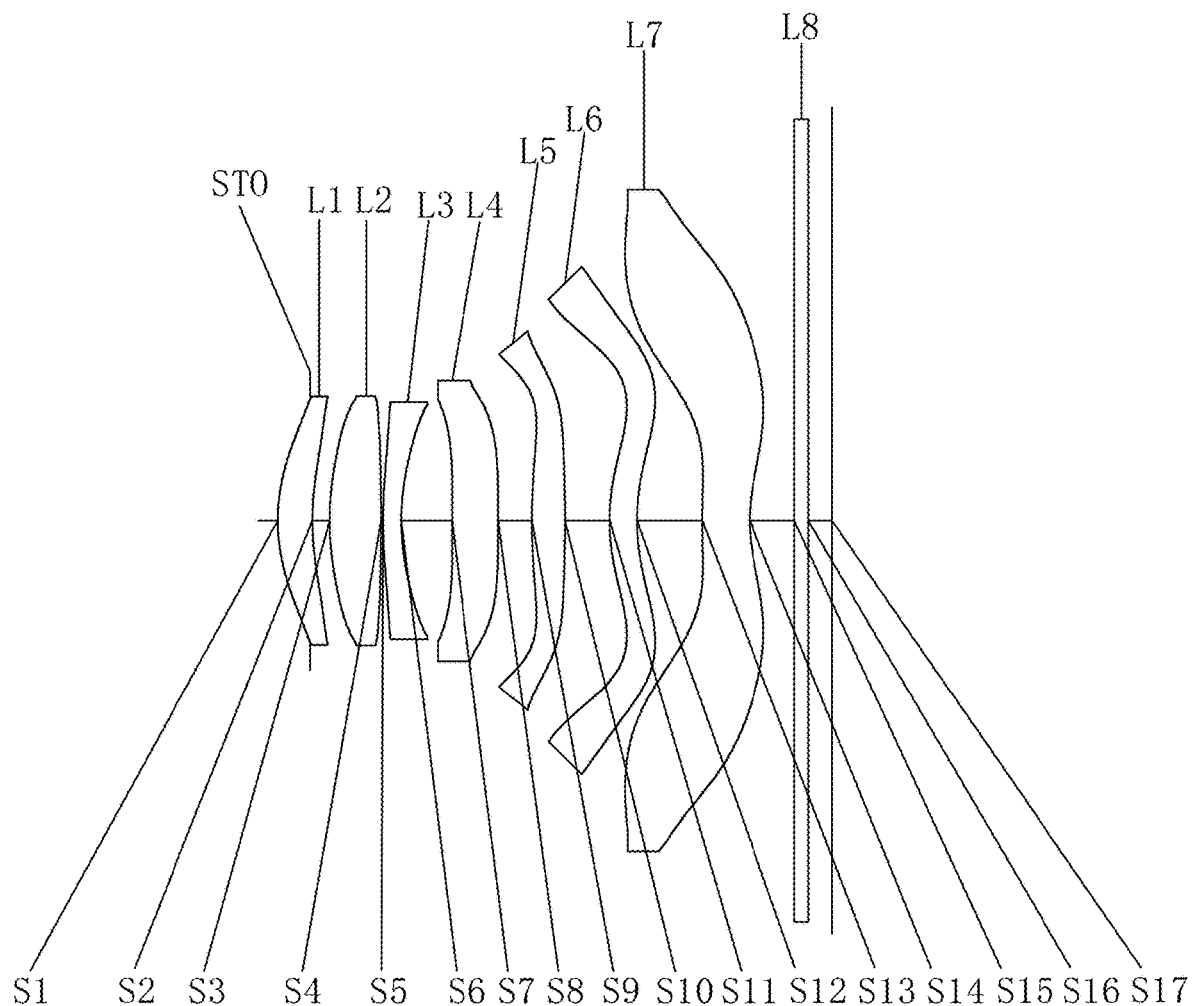
FIG. 9 is a schematic view of an optical system according to Embodiment 5 of the present disclosure.

An optical system according to Embodiment 5 of the present disclosure is described below with reference to FIG. 9 to FIG. 10C. In this embodiment, for brevity, the description similar to that of Embodiment 1 will be omitted. FIG. 9 is a schematic view of an optical system according to Embodiment 5 of the present disclosure.

As shown in FIG. 9, the optical system includes a first lens L1, a second lens L2, a third lens L3, a fourth lens L4, a fifth lens L5, a sixth lens L6, a seventh lens L7 and an imaging surface S17 in sequence from an object side to an image side along an optical axis.

The first lens L1 has positive refractive power, with an object-side surface S1 being convex at the optical axis and convex at the circumference and an image-side surface S2 being concave at the optical axis and concave at the circumference.

The second lens L2 has positive refractive power, with an object-side surface S3 being convex at the optical axis and convex at the circumference and an image-side surface S4 being convex at the optical axis and convex at the circumference.

The third lens L3 has negative refractive power, with an object-side surface S5 being convex at the optical axis and convex at the circumference and an image-side surface S6 being concave at the optical axis and concave at the circumference.

The fourth lens L4 has negative refractive power, with an object-side surface S7 being concave at the optical axis and concave at the circumference and an image-side surface S8 being concave at the optical axis and convex at the circumference.

The fifth lens L5 has positive refractive power, with an object-side surface S9 being convex at the optical axis and concave at the circumference and an image-side surface S10 being convex at the optical axis and convex at the circumference.

The sixth lens L6 has positive refractive power, with an object-side surface S11 being convex at the optical axis and concave at the circumference and an image-side surface S12 being concave at the optical axis and convex at the circumference.

The seventh lens L7 has negative refractive power, with an object-side surface S13 being convex at the optical axis and convex at the circumference and an image-side surface S14 being concave at the optical axis and convex at the circumference.

The object-side surface and the image-side surface of each of the first lens L1 to the seventh lens L7 are both aspheric. The design of aspheric surfaces can solve the problem of distortion of the field of view, and enable the lens to achieve an excellent optical imaging effect in the case of being smaller, thinner and flatter, so as to make the optical system have miniaturization characteristics.

The first lens L1 to the seventh lens L7 are all made of plastic. The lens made of plastic can reduce the weight of the optical system and can further reduce manufacturing costs.

A diaphragm STO is further arranged between an object OBJ and the first lens L1, to further improve the imaging quality of the optical system. The optical system further includes a filter L8 having an object-side surface S15 and an image-side surface S16. Light from the object OBJ sequentially passes through the surfaces S1 to S16 and is finally imaged on the imaging surface S17. Further, the filter L8 is an infrared filter, configured to filter out infrared light in external light incident into the optical system to avoid imaging distortion.

Table 12 shows surface types, curvature radii, thicknesses, materials, refractive indexes, Abbe numbers and effective focal lengths of the lenses of the optical system according to Embodiment 5, wherein the curvature radii, the thicknesses and the effective focal lengths of the lenses are all in millimeters (mm). Table 13 shows higher-order-term coefficients applicable to the aspheric surfaces S1 to S14 of the lenses in Embodiment 5, wherein the aspheric surface types may be defined by the formula (1) provided in Embodiment 1. Table 14 shows values of related parameters of the optical system according to Embodiment 5. A reference wavelength is 555 nm.

TABLE 12

Embodiment 5
f = 6.78 mm, FNO = 1.78, FOV = 84.9°, TTL = 8.1 mm

| Surface number | Surface name | Surface type | Curvature radius | Thickness | Material | Refractive index | Abbe number | Focal length |
|---|---|---|---|---|---|---|---|---|
| OBJ | Object surface | Spherical | Infinity | Infinity | | | | |
| STO | Diaphragm | Spherical | Infinity | −0.476 | | | | |
| S1 | First lens | Aspheric | 3.032 | 0.506 | Plastic | 1.55 | 56.11 | 15.29 |
| S2 | | Aspheric | 4.481 | 0.251 | | | | |
| S3 | Second lens | Aspheric | 4.584 | 0.750 | Plastic | 1.55 | 56.11 | 7.83 |
| S4 | | Aspheric | −59.148 | 0.030 | | | | |
| S5 | Third lens | Aspheric | 7.335 | 0.265 | Plastic | 1.68 | 19.25 | −10.93 |
| S6 | | Aspheric | 3.632 | 0.746 | | | | |
| S7 | Fourth lens | Aspheric | −990.000 | 0.673 | Plastic | 1.64 | 23.54 | −711.65 |
| S8 | | Aspheric | 855.000 | 0.497 | | | | |
| S9 | Fifth lens | Aspheric | 11.565 | 0.480 | Plastic | 1.55 | 56.11 | 14.30 |
| S10 | | Aspheric | −23.660 | 0.651 | | | | |
| S11 | Sixth lens | Aspheric | 3.450 | 0.400 | Plastic | 1.64 | 23.54 | 60.56 |
| S12 | | Aspheric | 3.612 | 0.952 | | | | |
| S13 | Seventh lens | Aspheric | 9.621 | 0.695 | Plastic | 1.55 | 56.11 | −6.95 |
| S14 | | Aspheric | 2.652 | 0.653 | | | | |
| S15 | Infrared filter | Spherical | Infinity | 0.210 | Glass | | | |
| S16 | | Spherical | Infinity | 0.340 | | | | |
| S17 | Imaging surface | Spherical | Infinity | 0.000 | | | | |

TABLE 13

Embodiment 5
Aspheric coefficient

| Surface number | K | A4 A14 | A6 A16 | A8 A18 | A10 A20 | A12 |
|---|---|---|---|---|---|---|
| S1 | −3.1163E+00 | 6.9400E−03 −4.0000E−05 | −2.1100E−03 3.0000E−05 | −5.1000E−04 −1.0000E−05 | 2.7000E−04 0.0000E+00 | −6.0000E−05 |
| S2 | −1.7839E+01 | 9.2100E−03 −4.9000E−04 | −1.3740E−02 1.1000E−04 | 6.2900E−03 −1.0000E−05 | −2.9200E−03 0.0000E+00 | 1.4200E−03 |
| S3 | −1.9168E+01 | 1.6610E−02 1.5600E−03 | −1.1830E−02 −5.0000E−04 | 2.3800E−03 9.0000E−05 | 2.8200E−03 −1.0000E−05 | −2.8600E−03 |
| S4 | −1.8366E−01 | −4.3400E−03 −3.4100E−03 | 3.6700E−03 1.0800E−03 | −1.8700E−03 −1.8000E−04 | −3.6300E−03 1.0000E−05 | 5.6200E−03 |
| S5 | −1.5000E+01 | −2.6200E−02 −4.3600E−03 | 1.7310E−02 1.3800E−03 | −4.9900E−03 −2.3000E−04 | −5.4900E−03 2.0000E−05 | 7.5600E−03 |
| S6 | −7.3660E+00 | −1.0450E−02 −4.4900E−03 | 7.9900E−03 1.2800E−03 | 4.6400E−03 −2.0000E−04 | −1.1370E−02 1.0000E−05 | 9.4500E−03 |
| S7 | −1.5000E+01 | −1.9160E−02 5.1600E−03 | 5.2600E−03 −1.5000E−03 | −1.0250E−02 2.4000E−04 | 1.3370E−02 −2.0000E−05 | −1.0650E−02 |
| S8 | −1.5000E+01 | −2.1450E−02 9.3000E−04 | 1.1600E−02 −2.1000E−04 | −3.5700E−03 2.0000E−05 | 4.0500E−03 0.0000E+00 | −2.5200E−03 |
| S9 | −1.5000E+01 | 8.0300E−03 6.0000E−05 | −9.8700E−03 −1.0000E−05 | 3.0300E−03 0.0000E+00 | −5.7000E−04 0.0000E+00 | −9.0000E−05 |
| S10 | 6.9870E+00 | 1.1840E−02 −2.0000E−05 | −1.1640E−02 0.0000E+00 | 5.6300E−03 0.0000E+00 | −1.8400E−03 0.0000E+00 | 3.2000E−04 |
| S11 | −5.3030E+00 | 1.0890E−02 2.0000E−05 | −1.4750E−02 0.0000E+00 | 3.4300E−03 0.0000E+00 | −2.6000E−04 0.0000E+00 | −6.0000E−05 |
| S12 | −1.1410E+01 | 2.8500E−02 −1.0000E−05 | −2.2900E−02 0.0000E+00 | 6.8100E−03 0.0000E+00 | −1.2700E−03 0.0000E+00 | 1.5000E−04 |
| S13 | −1.2864E+01 | −6.0980E−02 0.0000E+00 | 8.2700E−03 0.0000E+00 | −3.5000E−03 0.0000E+00 | −2.0000E−05 0.0000E+00 | 0.0000E+00 |
| S14 | −7.5687E+00 | −2.8830E−02 0.0000E+00 | 3.6700E−03 0.0000E+00 | −2.8000E−04 0.0000E+00 | 1.0000E−05 0.0000E+00 | 0.0000E+00 |

TABLE 14

| | | | |
|---|---|---|---|
| f (mm) | 6.78 | f/R14 | 2.56 |
| FNO | 1.78 | f2/f | 1.15 |
| FOV (°) | 84.9 | TTL/T34 | 10.86 |
| ImgH (mm) | 6.34 | TTL/f | 1.19 |
| TTL (mm) | 8.1 | (R11 + R12)/(R11 − R12) | −43.45 |
| TTL/ImgH | 1.28 | TTL/CT7 | 11.65 |

Figure 10A:
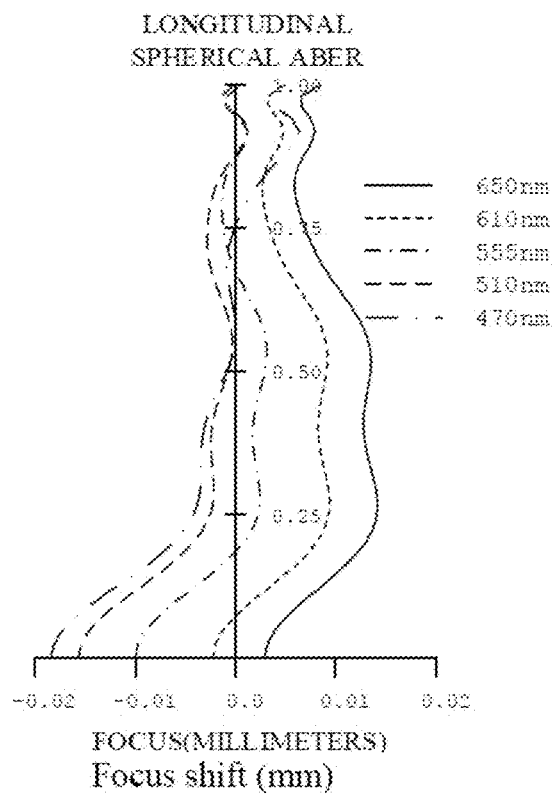
FIG. 10A to FIG. 10C show longitudinal spherical aberration curves, astigmatic field curves and distortion curves of the optical system according to Embodiment 5 respectively.
Figure 10B:
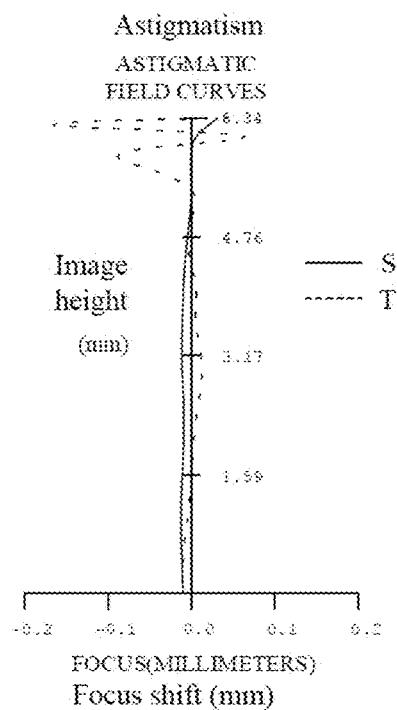
Figure 10C:
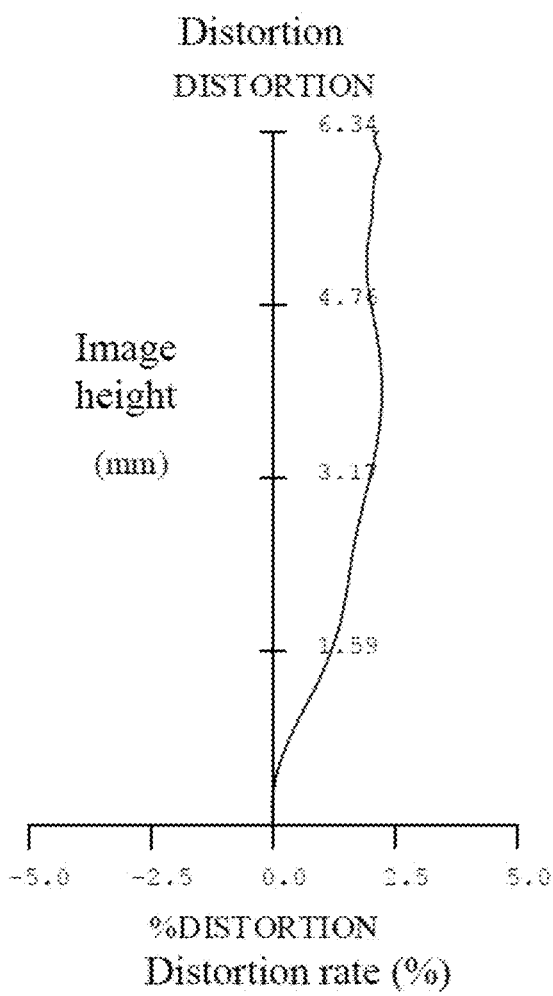

FIG. 10A shows longitudinal spherical aberration curves of the optical system according to Embodiment 5, which respectively indicate focus shift of light with different wavelengths after convergence through the optical system. FIG. 10B shows astigmatic field curves of the optical system according to Embodiment 5, which indicate curvature of a tangential image surface and curvature of a sagittal image surface. FIG. 10C shows distortion curves of the optical system according to Embodiment 5, which indicate distortion rates at different image heights. It may be known from FIG. 10A to FIG. 10C that the optical system according to Embodiment 5 can achieve good imaging quality.

The present disclosure further provides an image capturing apparatus, including the optical system as described above; and a photosensitive element arranged on the image side of the optical system to receive light carrying image information formed by the optical system. Specifically, the photosensitive element may be a complementary metal oxide semiconductor (CMOS) image sensor or a CCD image sensor.

The image capturing apparatus can obtain clear and bright images by using the optical system even under dark light conditions. At the same time, the image capturing apparatus is also miniaturized for easy adaptation to apparatuses with a limited size, such as slim electronic devices.

The present disclosure further provides an electronic apparatus, including a housing and the image capturing apparatus described above. The image capturing apparatus is mounted to the housing to acquire an image.

Specifically, the image capturing apparatus is arranged in the housing and is exposed from the housing to acquire an image. The housing can provide dustproof, waterproof and shatter-resistant protection for the image capturing apparatus. The housing is provided with a hole corresponding to the image capturing apparatus, to allow light to penetrate into or out of the housing through the hole.

The electronic apparatus features a slim structure. Bright Images with a good blurring effect and high definition can be obtained by using the image capturing apparatus described above, so as to meet users' needs of multi-scene and professional photographing.

Technical features of the above embodiments may be combined randomly. To make descriptions brief, not all possible combinations of the technical features in the embodiments are described. Therefore, as long as there is no contradiction between the combinations of the technical features, they should all be considered as scopes disclosed in the specification.

The above embodiments only describe several implementations of the present disclosure, which are described specifically and in detail, and therefore cannot be construed as a limitation on the invention patent scope. It should be pointed out that those of ordinary skill in the art may also make several changes and improvements without departing from the ideas of the present disclosure, all of which fall within the protection scope of the present disclosure. Therefore, the patent protection scope of the present disclosure shall be subject to the appended claims.

Technical features of the above embodiments may be combined randomly. To make descriptions brief, not all possible combinations of the technical features in the embodiments are described. Therefore, as long as there is no contradiction between the combinations of the technical features, they should all be considered as scopes disclosed in the specification.

The above embodiments only describe several implementations of the present disclosure, which are described specifically and in detail, and therefore cannot be construed as a limitation on the patent scope. It should be pointed out that those of ordinary skill in the art may also make several changes and improvements without departing from the ideas of the present disclosure, all of which fall within the protection scope of the present disclosure. Therefore, the protection scope of the present disclosure shall be subject to the appended claims.

The invention claimed is:

1. An optical system, comprising a first lens, a second lens, a third lens, a fourth lens, a fifth lens, a sixth lens and a seventh lens in sequence from an object side to an image side along an optical axis, wherein
   the first lens has positive refractive power, with an object-side surface being convex at the optical axis and an image-side surface being concave at the optical axis;
   the second lens has positive refractive power, with an object-side surface being convex at the optical axis;
   the third lens has negative refractive power, with an object-side surface being convex at the optical axis and an image-side surface being concave at the optical axis;
   the fifth lens has positive refractive power, with an image-side surface being convex at the optical axis;
   the seventh lens has negative refractive power, with an image-side surface being concave at the optical axis; and
   the optical system satisfies the following relation:

$TTL/ImgH<1.3$;

where TTL is a distance on the optical axis from the object-side surface of the first lens to an imaging surface of the optical system, and ImgH is half of a diagonal length of an effective pixel region on the imaging surface of the optical system;
   the optical system satisfies the following relation:

$FNO<1.9$;

where FNO is an f-number of the optical system;

$7<TTL/T34<12$;

where TTL is a distance on the optical axis from object-side surface of the first lens to an imaging surface of the optical system, and T34 is a distance on the optical axis from image-side surface of the third lens to an object-side surface of the fourth lens.

2. The optical system according to claim 1, wherein the optical system satisfies the following relation:

$1.5<f/R14<2.6$;

where f is an effective focal length of the optical system, and R14 is a curvature radius of the image-side surface of the seventh lens at the optical axis.

3. The optical system according to claim 1, wherein the optical system satisfies the following relation:

$1<f2/f<1.7$;

where f2 is an effective focal length of the second lens, and f is an effective focal length of the optical system.

4. The optical system according to claim 1, wherein the optical system satisfies the following relation:

$-50<(R11+R12)/(R11-R12)<100$;

where R11 is a curvature radius of an object-side surface of the sixth lens at the optical axis, and R12 is a curvature radius of an image-side surface of the sixth lens at the optical axis.

5. The optical system according to claim 1, wherein the optical system satisfies the following relation:

$8<TTL/CT7<15$;

where TTL is a distance on the optical axis from the object-side surface of the first lens to an imaging surface of the optical system, and CT7 is a distance of the seventh lens on the optical axis.

6. An image capturing apparatus, comprising:
the optical system according to claim 1; and
a photosensitive element, the photosensitive element being arranged on the image side of the optical system.

7. An electronic apparatus, comprising:
a housing; and
the image capturing apparatus according to claim 6, the image capturing apparatus being mounted to the housing.

8. An optical system, comprising a first lens, a second lens, a third lens, a fourth lens, a fifth lens, a sixth lens and a seventh lens in sequence from an object side to an image side along an optical axis, wherein
the first lens has positive refractive power, with an object-side surface being convex at the optical axis and an image-side surface being concave at the optical axis;
the second lens has positive refractive power, with an object-side surface being convex at the optical axis;
the third lens has negative refractive power, with an object-side surface being convex at the optical axis and an image-side surface being concave at the optical axis;
the fifth lens has positive refractive power, with an image-side surface being convex at the optical axis;
the seventh lens has negative refractive power, with an image-side surface being concave at the optical axis; and
the optical system satisfies the following relation:

$TTL/ImgH<1.3;$ where TTL is a distance on the optical axis from the object-side surface of the first lens to an imaging surface of the optical system, and ImgH is half of a diagonal length of an effective pixel region on the imaging surface of the optical system;
the optical system satisfies the following relation:

$FNO<1.9;$ where FNO is an f-number of the optical system, $1<TTL/f<1.3;$ where TTL is a distance on the optical axis from the object-side surface of the first lens to an imaging surface of the optical system, and f is an effective focal length of the optical system;

$7<TTL/T34<12;$ where TTL is a distance on the optical axis from the object-side surface of the first lens to an imaging surface of the optical system, and T34 is a distance on the optical axis from the image-side surface of the third lens to an object-side surface of the fourth lens.

9. The optical system according to claim 8, wherein the optical system satisfies the following relation:

$1.5<f/R14<2.6;$ where f is an effective focal length of the optical system, and R14 is a curvature radius of the image-side surface of the seventh lens at the optical axis.

10. The optical system according to claim 8, wherein the optical system satisfies the following relation:

$1<f2/f<1.7;$ where f2 is an effective focal length of the second lens, and f is an effective focal length of the optical system.

11. The optical system according to claim 8, wherein the optical system satisfies the following relation:

$-50<(R11+R12)/(R11-R12)<100;$ where R11 is a curvature radius of an object-side surface of the sixth lens at the optical axis, and R12 is a curvature radius of an image-side surface of the sixth lens at the optical axis.

12. The optical system according to claim 8, wherein the optical system satisfies the following relation:

$8<TTL/CT7<15;$ where TTL is a distance on the optical axis from the object-side surface of the first lens to an imaging surface of the optical system, and CT7 is a thickness of the seventh lens on the optical axis.

* * * * *